United States Patent [19]
Osaka et al.

[11] Patent Number: 5,524,166
[45] Date of Patent: Jun. 4, 1996

[54] SEPARATING TOOL FOR MULTI-CORE RIBBON FIBER

[75] Inventors: Keiji Osaka; Tetsuaki Watanabe; Ken Kashima, all of Yokohama, Japan

[73] Assignee: Sumitomo Electric Industries, Ltd., Japan

[21] Appl. No.: 308,533

[22] Filed: Sep. 21, 1994

[30] Foreign Application Priority Data

Oct. 20, 1993 [JP] Japan .................................. 5-262537

[51] Int. Cl.$^6$ ........................................... G02B 6/00
[52] U.S. Cl. ..................... 385/134; 385/114; 385/115; 385/136
[58] Field of Search ........................ 385/27, 31, 100, 385/114, 115, 134, 136, 137

[56] References Cited

U.S. PATENT DOCUMENTS

| | | | |
|---|---|---|---|
| T900,002 | 7/1972 | Weilar II | 385/114 X |
| 4,046,298 | 9/1977 | Schroeder, Jr. | 385/114 X |
| 4,179,964 | 12/1979 | Kirkgasser et al. | 83/599 |
| 4,630,887 | 12/1986 | Taylor | 385/114 X |
| 4,720,165 | 1/1988 | Tokuda et al. | 385/114 X |
| 4,828,349 | 5/1989 | Nakasuji | 385/114 X |
| 5,076,881 | 12/1991 | Ferguson | 385/114 X |

FOREIGN PATENT DOCUMENTS

| | | | |
|---|---|---|---|
| 3245871 | 6/1984 | Germany | 83/599 X |
| 63-316804 | 12/1988 | Japan | 385/114 X |
| 3213804 | 9/1991 | Japan | 385/114 X |

*Primary Examiner*—Brian Healy
*Attorney, Agent, or Firm*—Cushman Darby & Cushman

[57] ABSTRACT

The present invention provides a separating tool for separating a multi-core ribbon fiber obtained by arranging a plurality of optical fibers in a plane and integrating the fibers with a common coating into single-core optical fibers, and includes a fiber accommodating means for accommodating the multi-core ribbon fiber in an accommodating area, a fiber holding means for holding the multi-core ribbon fiber in the accommodating area, a scratching means for forming a scratch on a surface of a common coating of the multi-core ribbon fiber held by the fiber holding means, an arrangement defining means for changing an pitch position of the scratching means, and a shearing force applying means for applying a shearing force to the multi-core ribbon fiber along the scratch formed by the scratching means.

17 Claims, 27 Drawing Sheets

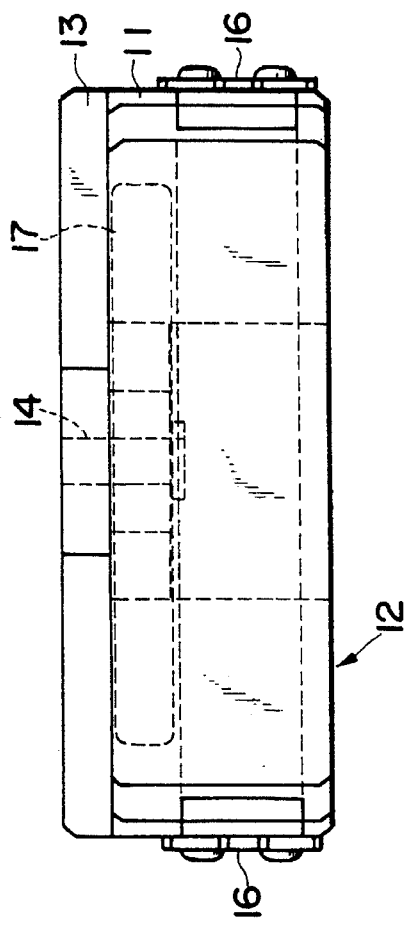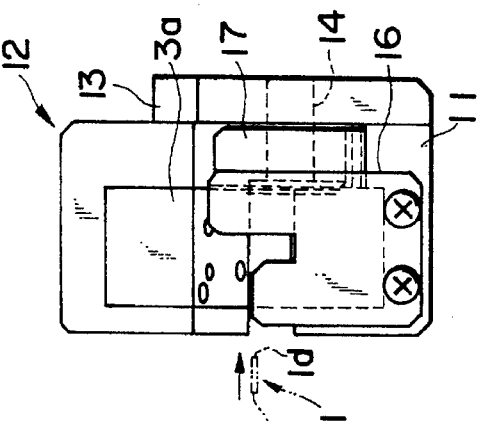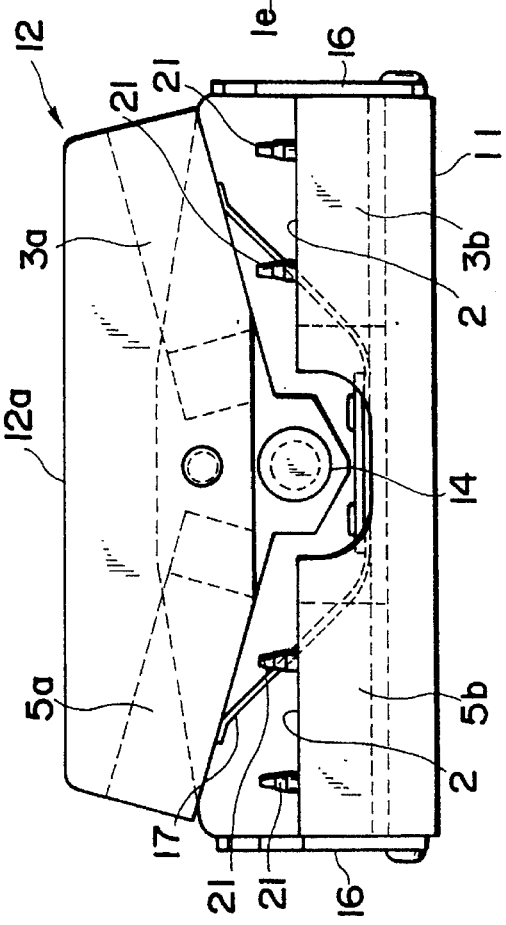

X-X SECTION

A-A SECTION

B-B SECTION

DETAILED VIEW OF PORTION A

Fig. 19
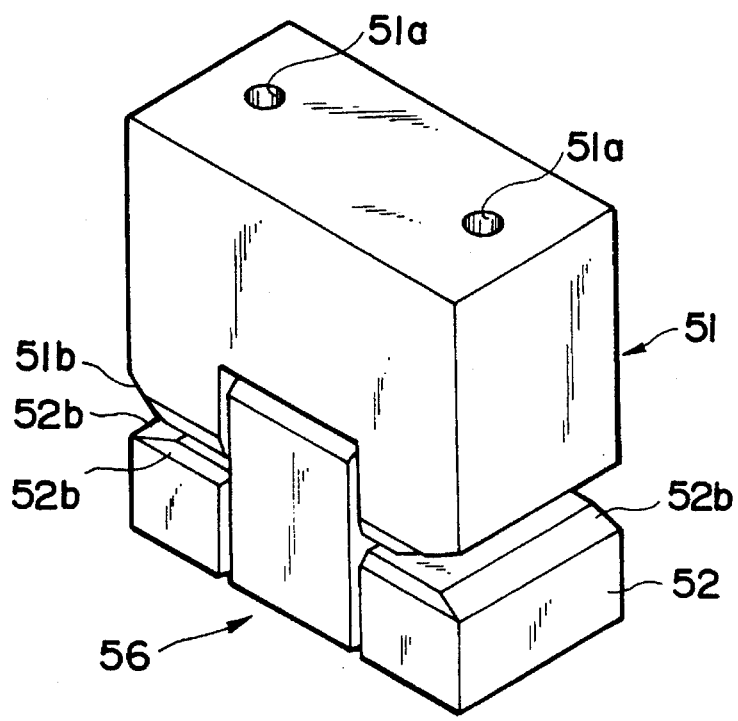
Fig. 20A
Fig. 20B
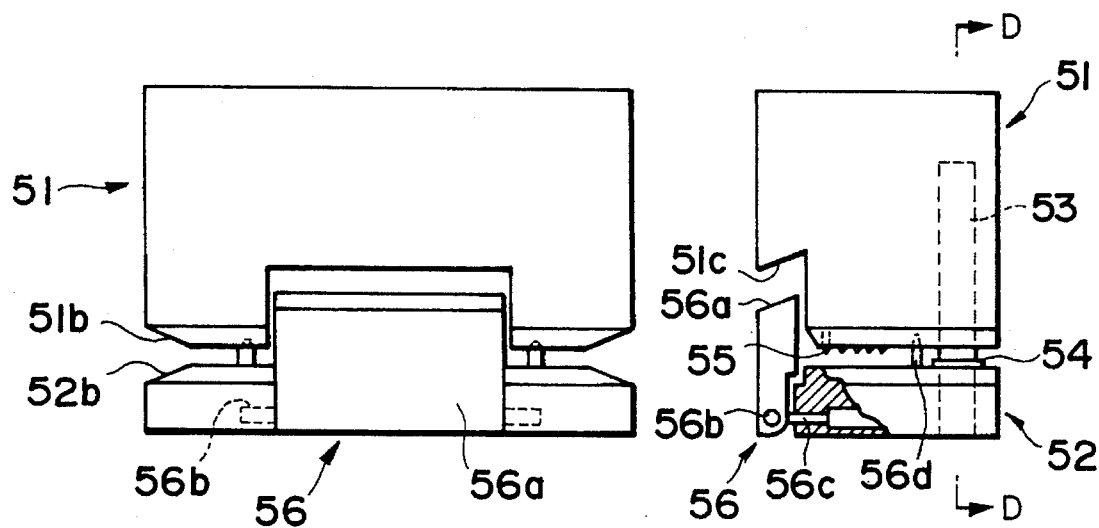

D-D SECTION

A-A SECTION

Fig. 31A
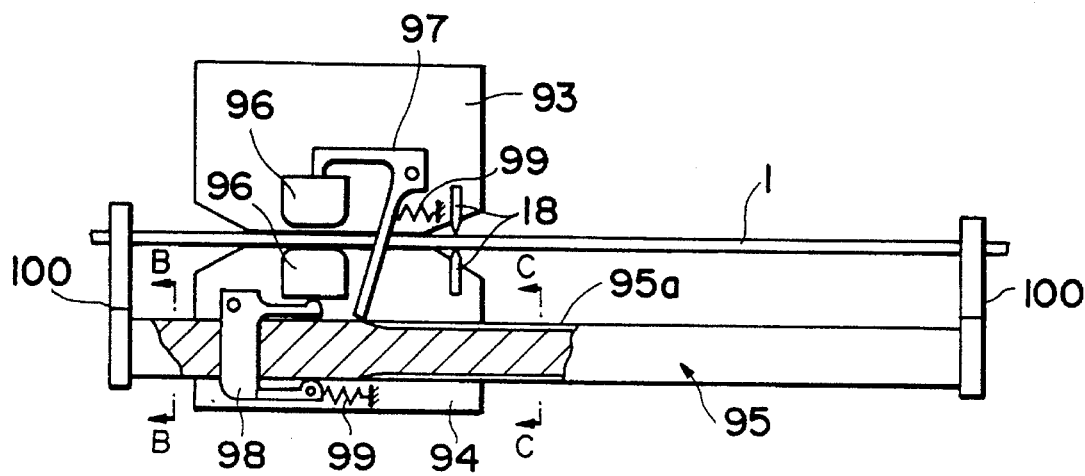
Fig. 31B
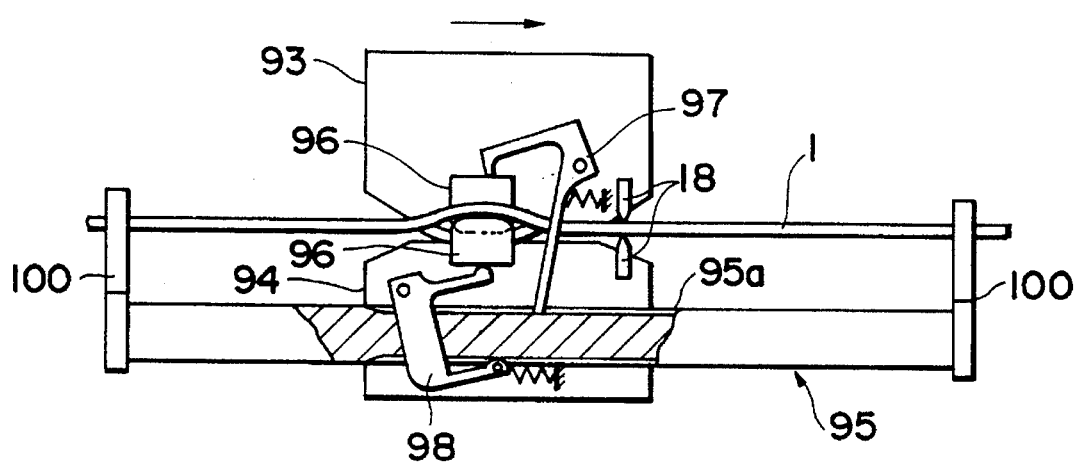
Fig. 31C  Fig. 31D
 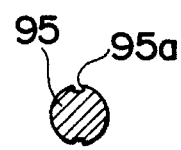
B-B SECTION  C-C SECTION

SEPARATING TOOL FOR MULTI-CORE RIBBON FIBER

BACKGROUND OF THE INVENTION

1. Field of the Invention

The present invention relates to a separating tool for separating a multi-core ribbon fiber with a plurality of optical fibers arranged in a plane and integrated with a common coating.

2. Related Background Art

As a separating tool capable of separating a multi-core ribbon fiber, one in which two boards are coupled to each other to be openable is known (Japanese Patent Laid-Open No. 3-213804).

However, the conventional separating tool merely divides a multi-core ribbon fiber into two portions and cannot separate it into three portions having arbitrary numbers of optical fibers, or into single-core optical fibers.

SUMMARY OF THE INVENTION

It is, therefore, an object of the present invention to provide a separating tool capable of separating a multi-core ribbon fiber into arbitrary numbers of optical fibers in various divisional states.

In order to achieve the above object, according to the present invention, there is provided a separating tool for separating the multi-core ribbon fiber with a plurality of optical fibers arranged in a plane and integrated with a common coating, into single-core optical fibers, comprising fiber container such as fiber accommodating means for containing or accommodating the multi-core ribbon fiber in a containing area, fiber holder such as fiber holding means for holding the multi-core ribbon fiber in the containing area, cutter such as scratching means for forming a scratch on a surface of the common coating of the multi-core ribbon fiber held by the fiber holder, arrangement holder such as arrangement defining means for detachably holding the cutter and defining an arranging state (e.g. pitch position) of the cutter, and shearing force applying member such as shearing force applying means for applying a shearing force to the multi-core ribbon fiber along the scratch formed by the cutter.

Since the present invention has the above structure, the multi-core ribbon fiber is reliably contained in the containing area by the fiber container, and is positioned in the containing area by the fiber holder at high precision. A scratch is formed on the common coating of the optical fibers of the positioned multi-core ribbon fiber by the cutter, and the shearing force applying member divides the multi-core ribbon fiber along the scratch. Divisional states ranging from division into halves to division into single-core optical fibers are possible by changing the arrangement of the cutter by the arrangement defining holder.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 19 is a perspective view showing the outer appearance of a separating tool according to the third embodiment, FIGS. 20A and 20B include views showing the separating tool according to the third embodiment.

DESCRIPTION OF THE PREFERRED EMBODIMENT

Figure 1A:
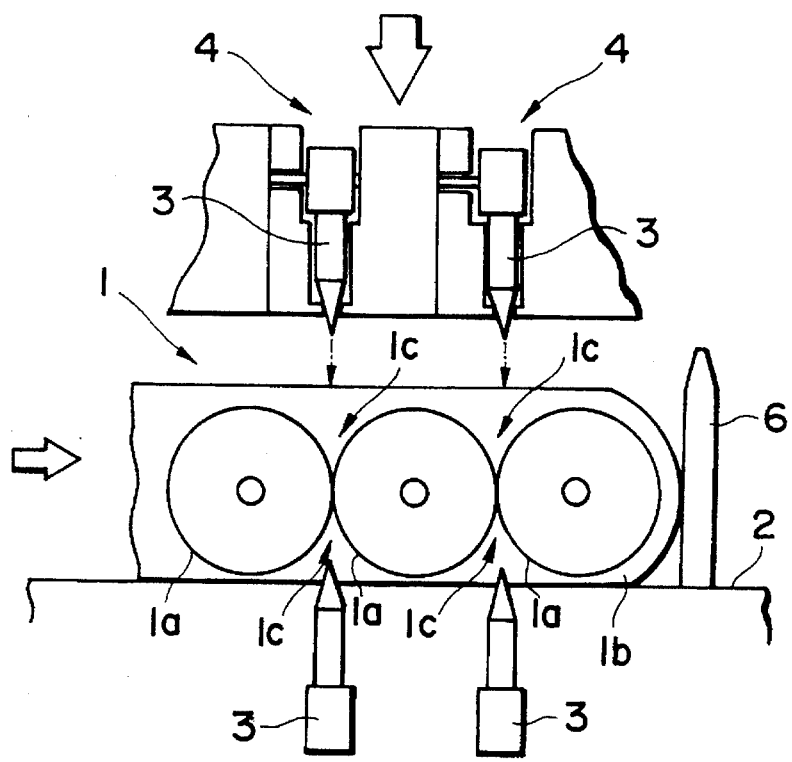
FIGS. 1A to 1C include schematic diagrams showing the separating principle of the present invention, FIGS. 2A to 2C include views showing the first embodiment of the present invention, FIGS. 3A to 3C include views showing components that can be used in a separating tool according to the first embodiment, FIGS. 4A to 4C include step views showing the operation of the separating tool according to the first embodiment, FIGS. 5A to 5C include views showing a pin arrangement defining member together with scratching pins that can be adopted in the first embodiment, FIGS. 6A to 6C include views showing a pin arrangement defining member together with scratching pins that can be adopted in the first embodiment, FIGS. 7A to 7G include perspective views showing examples of a scratching pin that can be adopted in the present invention, FIGS. 8A to 8B include views showing the operation of the scratching pin that can be adopted in the present invention.

A separating tool for a multi-core ribbon fiber according to an embodiment of the present invention will be described with reference to the accompanying drawings. In the description of the embodiment, the same elements are denoted by the same reference numerals, thereby avoiding a repeated description.

Figure 1B:
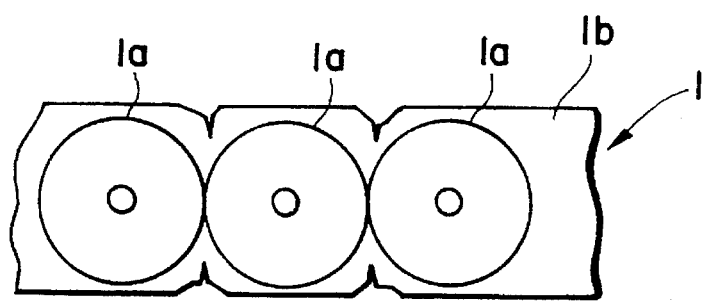
Figure 1C:
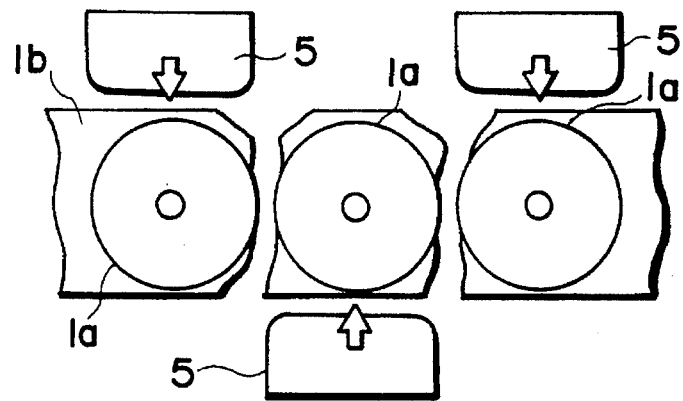

First, the principle of the present invention will be described with reference to FIGS. 1A–1C. FIGS. 1A–1C include schematic diagrams showing the principle of the present invention.

The present invention is basically constituted to include a scratching means 3, an arrangement changing means 4, and a shearing force applying means 5.

A multi-core ribbon fiber 1 that can be used in the present invention has a structure in which a plurality of optical fibers 1a arranged almost in a row are integrally fixed with a common coating 1b. When this multi-core ribbon fiber 1 is inserted in the separating tool of the present invention, it is first arranged in a fiber accommodating area 2. FIG. 1A shows a state wherein the multi-core ribbon fiber 1 is arranged in the fiber accommodating area 2. The scratching means 3 is arranged above the fiber accommodating area 2 with a gap therebetween which is at least the thickness of the multi-core ribbon fiber 1 or more. The scratching means 3 is mounted to an arrangement defining means 4 detachably or permanently. Since the arrangement defining means 4 moves in a direction perpendicular to the upper surface of the fiber accommodating area 2, it realizes various types of scratches (e.g., scratches for separation into the same numbers, and scratches for separation into different numbers).

The multi-core ribbon fiber 1 is fixed in the fiber accommodating area 2 with a positioning pin 6 projecting within the fiber accommodating area 2 and a fiber holding means (not shown) so that it will not move at least in a direction along which the optical fibers are aligned. In this state, the scratching means 3 is moved downward toward the multi-core ribbon fiber 1 to form thrust marks on the surface of the common coating 1b of the multi-core ribbon fiber 1, more specifically, into the recessed portions 1c formed between the optical fibers (see FIG. 1B). Although these thrust marks are as shallow as not reaching the optical fibers 1a, but their sizes are large enough to decrease the shearing strength of the multi-core ribbon fiber 1. These thrust marks are extended lengthwise as the scratching means are moved relative to the optical fibers 1a (the scratching means are moved or the optical fibers are moved) in the longitudinal direction of the optical fibers 1a. Thereafter, a shearing force is applied by a pair of shearing force applying means 5, arranged above and below the multi-core ribbon fiber 1 to sandwich it into the opposite direction with the adjacent pair perpendicular to the surface, along the enlarged scratches. Since the shearing strength of the multi-core ribbon fiber 1 has been weakened by the damages enlarged by the scratching means, the multi-core ribbon fiber 1 can be easily separated at desired separating positions (see FIG. 1C).

First Embodiment

Figure 3A:
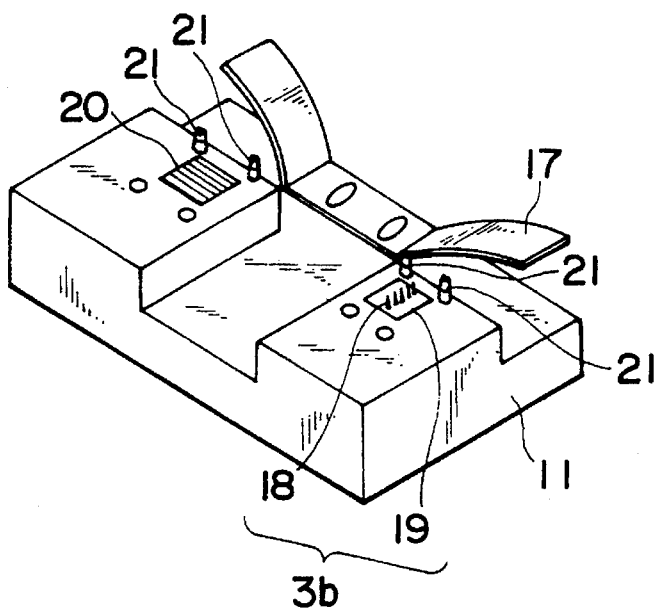
Figure 3B:
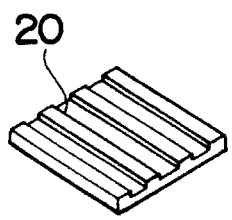
Figure 3C:
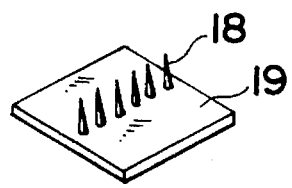
Figure 4A:
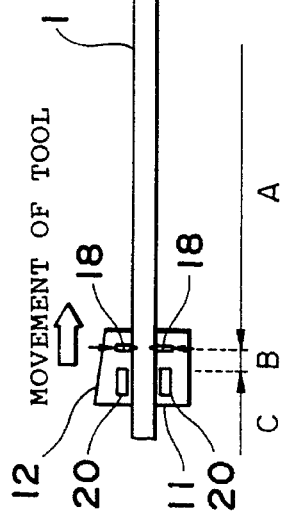
Figure 4B:
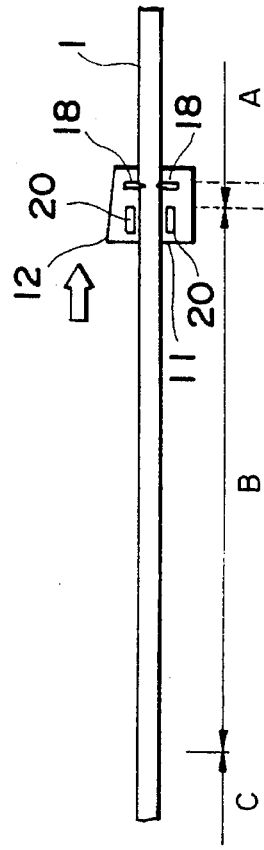
Figure 4C:
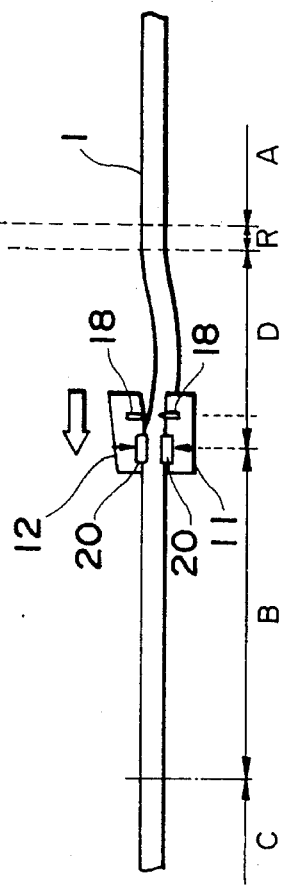

A separating tool for the multi-core ribbon fiber according to the first embodiment of the present invention will be described with reference to FIGS. 2A–2C to 6A–6C. FIGS. 2A–2C include views showing the separating tool according to the first embodiment of the present invention, in which FIG. 2A is a plane view, FIG. 2B is a front view, and FIG. 2C is a right side view of the first separating tool. FIGS. 3A–3C include perspective views showing components (shearing members, scratching pins, pin arrangement defining members, a plate spring, and the like) that can be used in the separating tool according to the first embodiment. FIGS. 4A–4C include step views showing the operation of the separating tool according to the first embodiment. FIGS. 5A–5C and 6A–6C are views showing a pin arrangement defining member together with scratching pins that can be employed in the first embodiment.

This separating tool is constituted to include a base member 11, a movable member 12, and a side plate 13. Most of the surface area of the base member 11 forms a fiber accommodating area, and substantially U-shaped members 16 (fiber holding means) are arranged on the two sides of the base member 11. The pair of scratching means 3 and arrangement defining means 4, and the pair of shearing force applying means 5 are arranged on one side (the right side in FIG. 2B) and the other side (the left side in FIG. 2B), respectively, to sandwich the fiber accommodating area 2 along a direction connecting the pair of substantially U-shaped members 16. Therefore, an upper scriber block 3a constituting the scratching means 3 and the arrangement defining means 4 is buried in one side of the lower surface of the movable member 12, and a lower scriber block 3b constituting the scratching means 3 is buried in one side of the upper surface of the base member 11. Similarly, an upper cutter block 5a constituting the shearing force applying means 5 is buried in the other side of the lower surface of the movable member 12, and a lower cutter block 5b constituting the shearing force applying means 5 is buried in the other side of the upper surface of the base member 11.

The side plate 13 is fixed to the rear side portion of the base member 11 with a screw or the like, and the pivotally movable member 12 is axially mounted to the side plate 13 through a shaft 14. The substantially U-shaped members 16 described above are fixed to the two side end portions of the base member 11 with screws or the like (see FIG. 2C). The multi-core ribbon fiber 1 is inserted from a front portion through the gap between the base member 11 and the movable member 12, and arranged in the openings of the substantially U-shaped members 16. When the multi-core ribbon fiber 1 is arranged in the substantially U-shaped members 16, it is positioned at least at two points. Since the separating tool according to this embodiment is used while the multi-core ribbon fiber 1 is pulled by clampers (not shown), at least positioning in the fiber accommodating area 2 is usually realized by two-point positioning. In order to complete two-point positioning, in this embodiment, a plurality of positioning pins 21 are arranged behind the fiber accommodating area 2 (see FIG. 2B). One side of the multi-core ribbon fiber 1 portion which is not positioned between the pair of substantially U-shaped members 16 is held by these positioning pins 21.

The movable member 12 is formed to have a pentagonal section (see FIG. 2B). A plate spring 17 is fixed behind the fiber accommodating area 2 of the base member 11 with screws or the like. The two end portions of the plate spring 17 are supported to bias a pair of inclined surfaces constituting the movable member 12 with equal forces. For this reason, the movable member 12 is maintained such that the gaps between the two end portions of the movable member 12 and the two end portions of the base member 11 (the gap between one end of the movable member 12 and one end of the base member 11, and the gap between the other end of the movable member 12 and the other end of the base member 11) are equal, and its longest side 12a is substantially parallel to the upper surface of the base member 11 (see FIG. 2B).

The upper and lower upper scriber blocks 3a and 3b are constituted to include a plurality of scratching pins 18 and a pin arrangement defining member 19. The scratching pins 18 are mounted to the pin arrangement defining member 19 in accordance with the divisional state of the multi-core ribbon fiber, and are exposed in the fiber accommodating area 2 (see FIG. 3C). Upper and lower shearing member dies for applying a shearing force are mounted to the upper and lower cutter blocks, respectively. When these upper and lower dies function in cooperation with each other, a shearing force is applied to the multi-core ribbon fiber 1. As the upper and lower shearing member dies (FIG. 3B), comb-like blades formed to mesh with each other can be used.

The operation of the separating tool according to the first embodiment will be described with reference to FIG. 4. The multi-core ribbon fiber 1 is set in clampers or the like, and the separating tool is mounted to one end of the multi-core ribbon fiber 1. In the mounted state, the movable member 12 is biased by the plate spring 17 so that it is maintained in a horizontal state (the initial state of the separating tool). Thus, even when the separating tool is slid along the multi-core ribbon fiber 1, the common coating 1b will not be damaged. However, when the movable member 12 is pivoted to move its one end downward, thereby moving the movable member 12 close to the pin arrangement defining member 19 mounted to the base member 11, the scratching pins 18 are urged against the multi-core ribbon fiber 1, thereby forming thrust marks on the common coating 1b (FIG. 4A). The separating tool is slid in the longitudinal direction of the multi-core ribbon fiber 1 while the scratching pins 18 thrust into the common coating 1b. By this sliding operation, the formed thrust marks are enlarged, and linear scratches are formed in the common coating 1b of the multi-core ribbon fiber 1 (FIG. 4B). Subsequently, the separating tool is returned to the horizontal state, and the movable member 12 is pivoted in the opposite direction to move its other end downward, thereby moving the movable member 12 close to shearing members 20 mounted to the base member 11 (FIG. 4C). Then, a shearing force is applied to the multi-core ribbon fiber 1 along the scratches, so that the common coating 1b is separated (FIG. 4C). In this state, the separating tool is moved along the multi-core ribbon fiber 1. When shearing is completed, the separating tool is returned to the initial state (separation end), and is removed from the separated multi-core ribbon fiber 1.

As a different process after scratches are formed, the separating tool may be returned to a scratching start point without shearing, and shearing may be performed to the same direction so that the scratches may be formed.

Figure 5A:
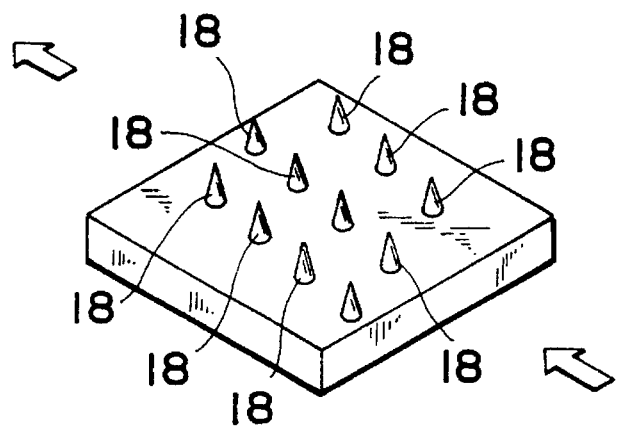
Figure 5B:
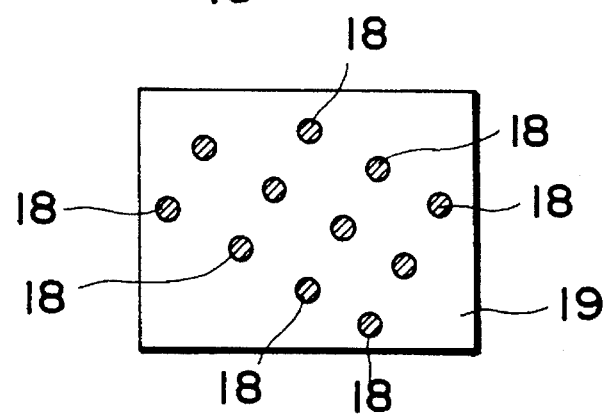
Figure 5C:
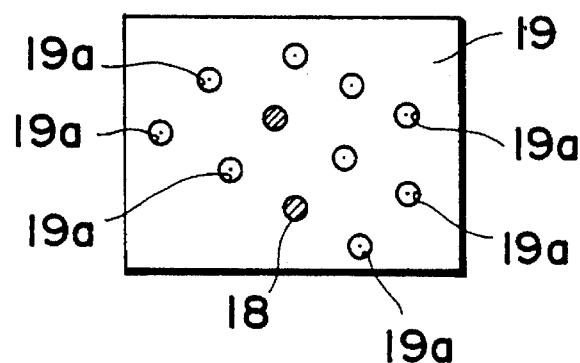
Figure 6A:
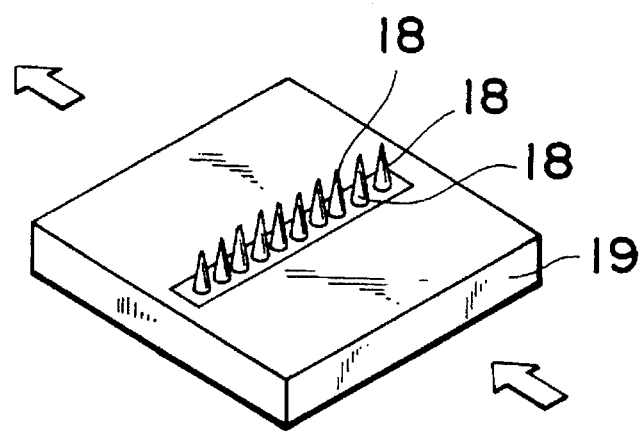
Figure 6B:
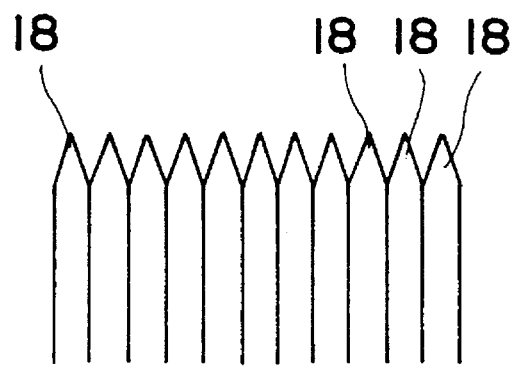
Figure 6C:
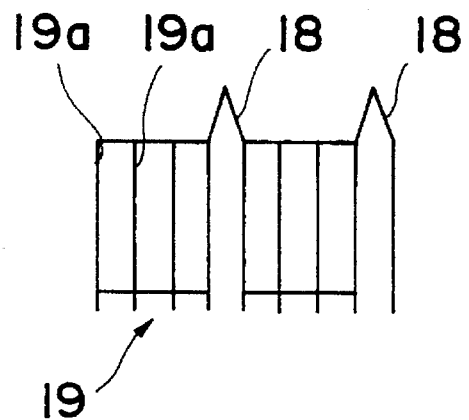

Modifications of the pin arrangement defining member will be described with reference to FIGS. 5A–5C and 6A–6C. A plurality of pins 18 are mounted on mounting portions 19a of a pin arrangement defining member 19 (FIGS. 5A and 6A). Eleven pins 18 can be mounted to all the mounting portions 19a. In this case, for example, a 12-core ribbon fiber 1 is separated into single-core optical fibers (see FIGS. 5B and 6B).

In addition to the above divisional state, even division for the 12-core ribbon fiber 1 into even numbers, e.g., division by 6 in units of 2 fibers, division by 4 in units of 3 fibers, division by 3 in units of 4 fibers (see FIGS. 5C and 6C), and division by 2 in units of 6 fibers, and uneven division for the 12-core ribbon fiber 1 into uneven numbers, e.g., division into 3 plus 9 and division into 3 plus 4 plus 5, can be easily realized.

According to the separating tool of this embodiment, a multi-core ribbon fiber 1 can be separated in accordance with a large number of various types of divisional states by exchanging the pin arrangement regulating means 19 and simply moving the movable member 12.

Modifications of the scratching means that can be used in this embodiment will be described with reference to FIGS. 7A–7G and 8A–8B. FIGS. 7A–7G include perspective views showing examples of a scratching pin that can be adopted in the present invention, and FIGS. 8A–8B include sectional views showing the operation of the scratching pin.

Figure 7A:
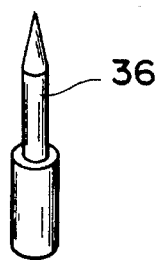
Figure 7B:
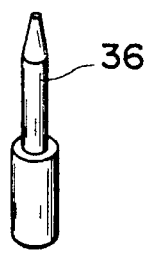
Figure 7C:
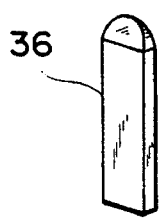
Figure 7D:
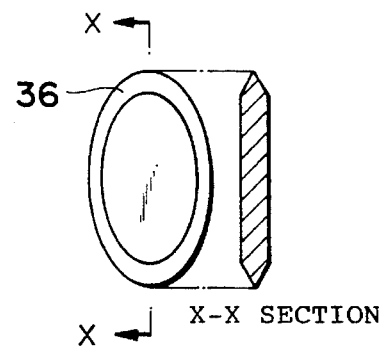
Figure 7E:
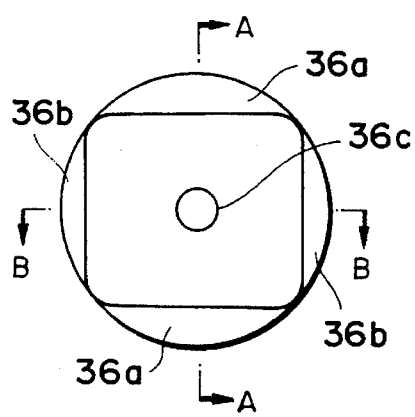
Figure 7F:
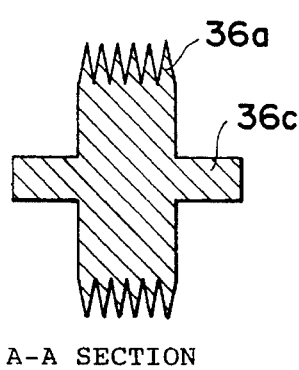
Figure 7G:
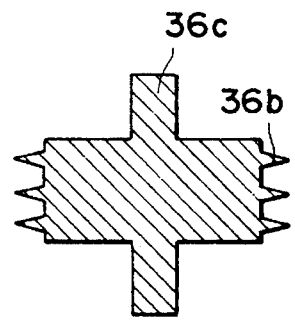
Figure 8B:
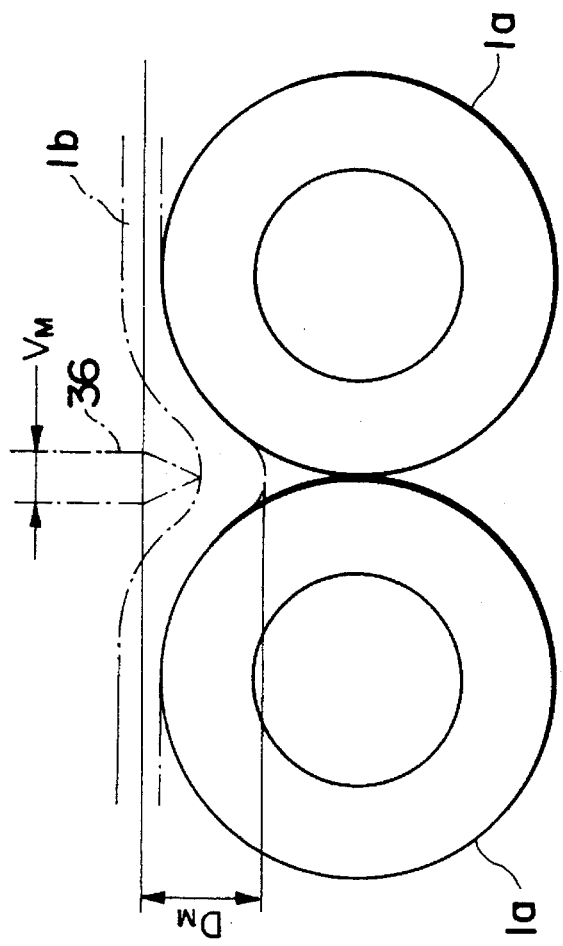
Figure 8A:
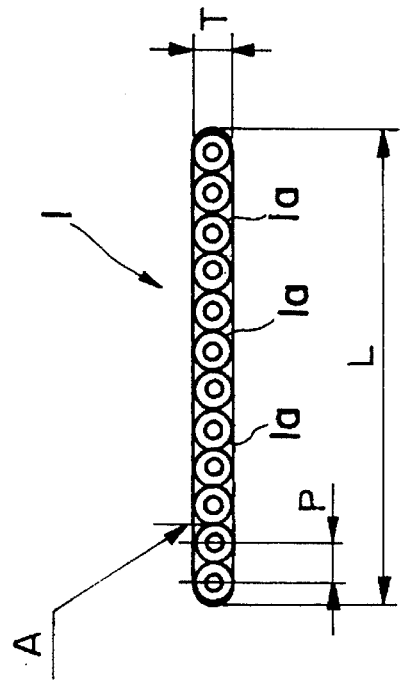

Generally, a scratching means must have a function of forming a thrust mark on a common coating 1b of a multi-core ribbon fiber 1 and a function of moving in the longitudinal direction of the multi-core ribbon fiber 1 after forming the thrust mark. Accordingly, a pin having a conical distal end (FIG. 7A) and a pin having a distal end with a shape of minus (–) (FIG. 7B) can be used. A disk-like shearing member having pointed ends may also be used (FIG. 7D). Furthermore, a composite shearing member in which, e.g., 6 shearing blades 36a are formed in the vertical direction within a predetermined arcuated region and 3 shearing blades 36b are formed in the horizontal direction within a predetermined arcuated region may also be used (see FIGS. 7E, 7F, and 7G). When this composite shearing member is used, the divisional state of a multi-core ribbon fiber can be altered in accordance with a choice as to whether the six shearing blades 36a or the three shearing blades 36b are exposed in the fiber accommodating area. This selection can be easily performed by rotating a shaft 36c forming part of the composite shearing member. These pins 36 are arranged at thick portions of the common coating 1b of the multi-core ribbon fiber 1, i.e., at recessed portions 1c formed between the optical fibers.

For example, when a multi-core ribbon fiber 1 incorporates 12 optical fibers 1a and has a thickness T of 275 μm, a pitch p of the optical fibers 1a of 250 μm, and a width L of 3.0 mm (see FIGS. 8A–8B), in order to allow a maximum depth DM up to 78 μm, an allowable error range VM with reference to the boundaries of the optical fibers 1a is about 30 μm. This can be achieved with the machining precision of an ordinary mechanical component.

Figure 9:
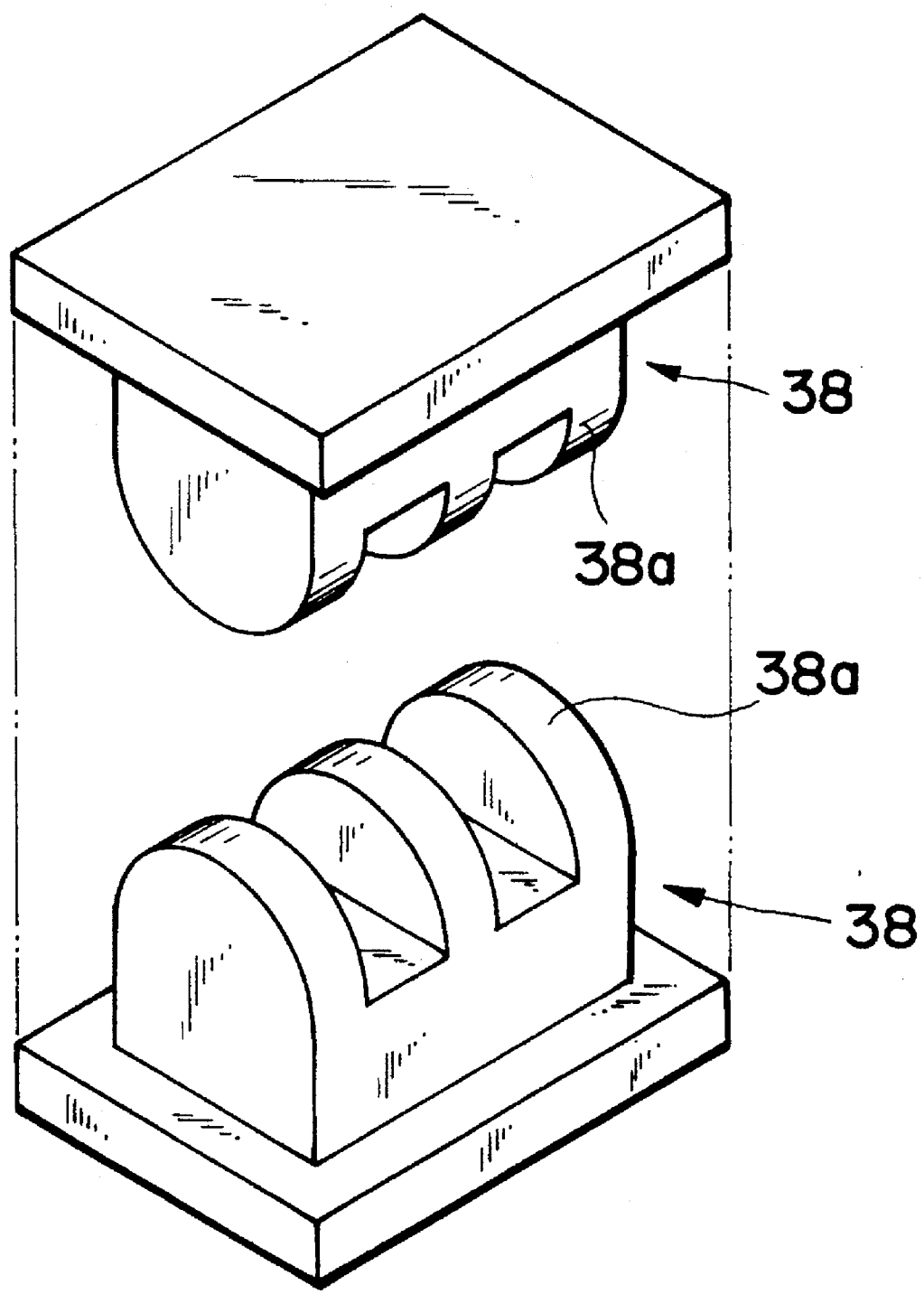
FIG. 9 is a perspective view showing an example of a shearing member that can be adopted in the present invention, FIGS. 10A and 10B include views showing the operation of a shearing member that can be adopted in the present invention, FIGS. 11A and 11B include views showing a shearing member that can be used for a 12-core ribbon fiber.
Figure 10A:
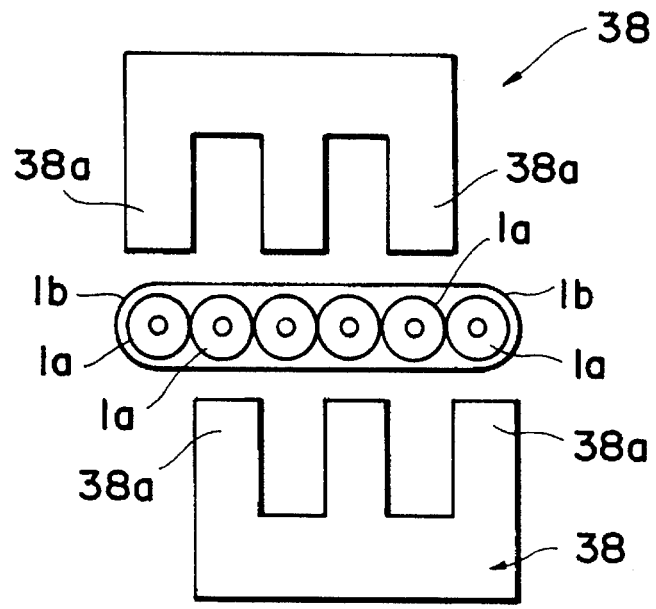
Figure 10B:
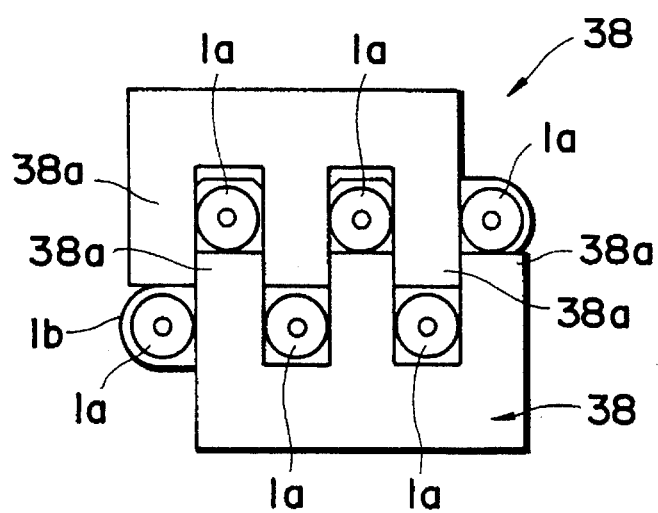
Figure 11B:
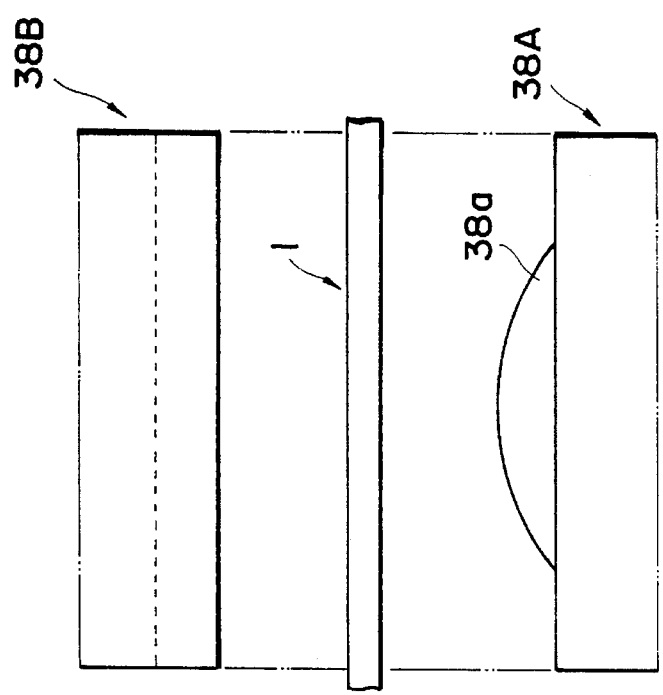
Figure 11A:
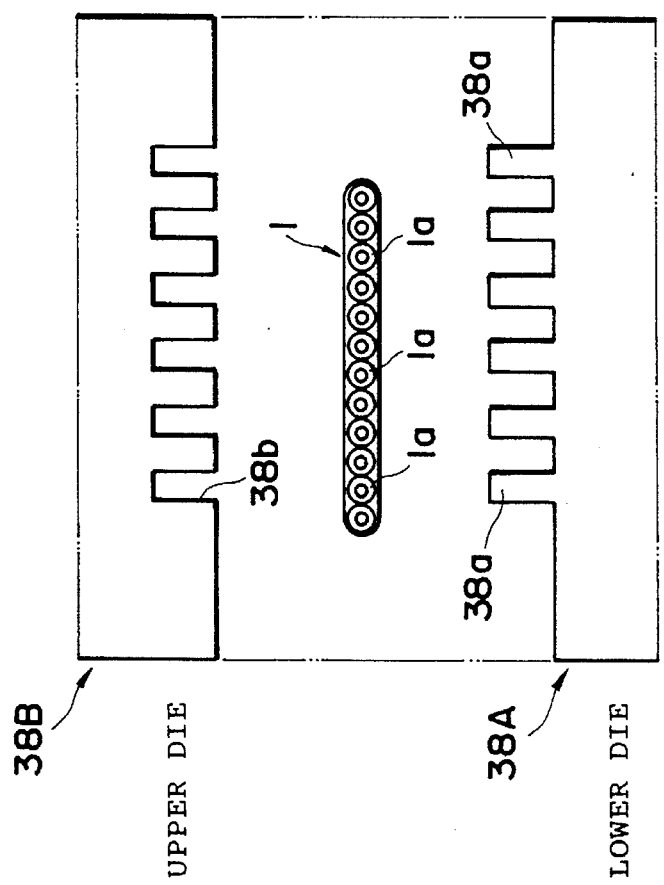

Modifications of the shearing force applying means that can be used in this embodiment will be described with reference to FIGS. 9 to 11A–11B. FIG. 9 is a perspective view showing an example of a shearing member that can be adopted in the present invention. FIGS. 10A–10B include step views showing the operation of the shearing member. FIG. 11A–11B include views showing a shearing member that can be used for a 12-core ribbon fiber.

The shearing force applying member has two types, i.e., a member having a projecting blade vs. a projecting blade, and a member having a projecting blade vs. a recessed member. For example, shearing members 38 show an example having a projecting blade vs. a projecting blade, in which three comb-like blades 38a are formed equidistantly (see FIG. 9). When these shearing members 38 are arranged to shear a 6-core ribbon fiber through a fiber accommodating area, the 6-core ribbon fiber can be separated into single-core optical fibers (see FIG. 10B).

FIGS. 11A–11B shows an example having a projecting blade vs. a recessed member, which is a shearing member capable of separating a multi-core ribbon fiber 1 having 12 fibers into single-core optical fibers. FIG. 11A is a view seen from the longitudinal direction when the multi-core ribbon fiber 1 is arranged, and FIG. 11B is a side view of FIG. 11A. This shearing member 38 is constituted to have upper and lower dies 38B and 38A. The lower die 38A has six comb-like blades 38a arranged equidistantly, and the upper die 38B has grooves 38b formed at positions to correspond to the comb-like blades 38a. When the lower and upper dies 38A and 38B mesh with each other, they apply a shearing force to the multi-core ribbon fiber 1.

Figure 12:
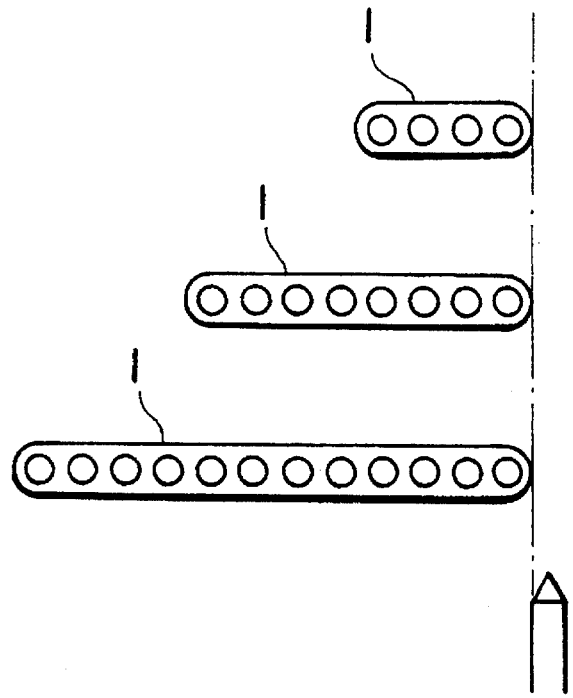
FIG. 12 is a view showing multi-core ribbon fibers that can be used in the present invention.
Figure 13:
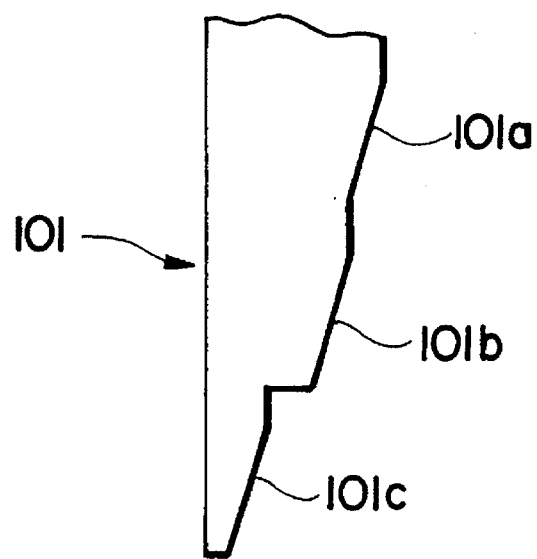
FIG. 13 is a view showing a positioning member capable of positioning multi-core ribbon fibers.
Figure 14:
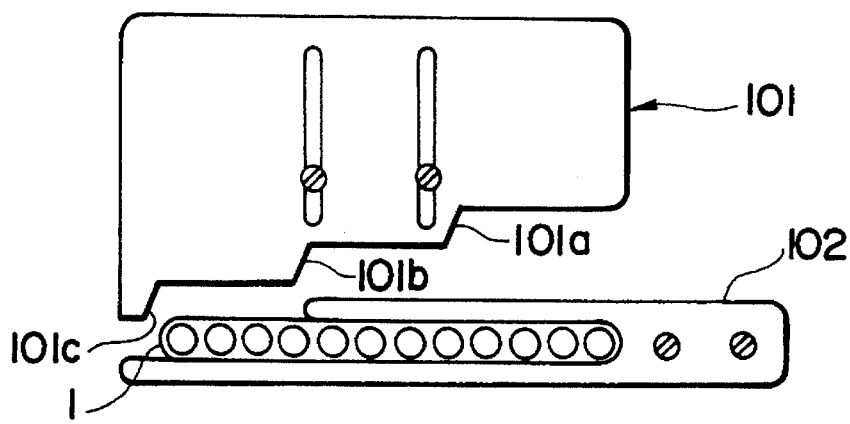
FIG. 14 is a view showing a positioning member capable of positioning multi-core ribbon fibers together with a holding member, FIGS. 15A and 15B include views showing another positioning member capable of positioning multi-core ribbon fibers together with a holding member.
Figure 15A:
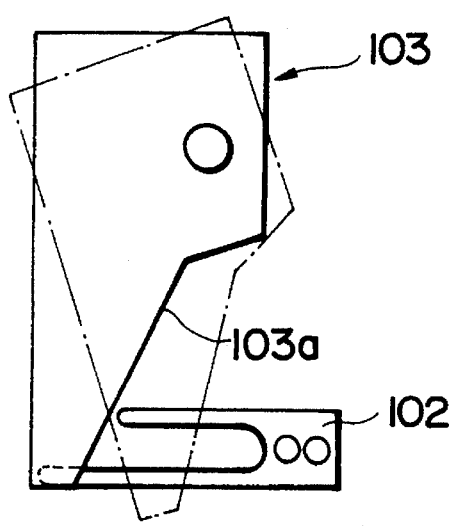
Figure 15B:
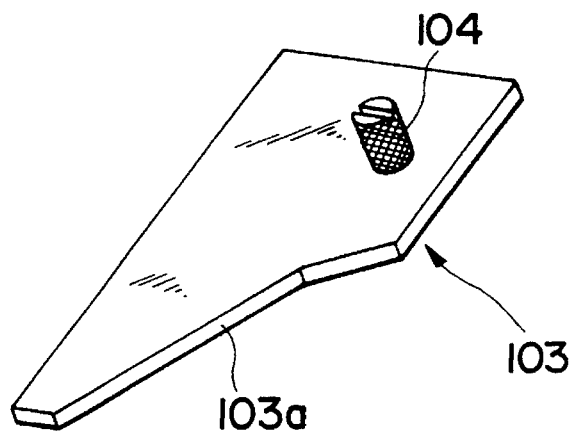

The types of multi-core ribbon fibers that can be utilized in this embodiment and a fiber holding means for holding these multi-core ribbon fibers will be described with reference to FIGS. 12 to 15A–15B. FIG. 12 shows multi-core ribbon fibers that can be used in the present invention. FIG. 13 shows a positioning member capable of positioning these multi-core ribbon fibers. FIG. 14 shows a variable positioning member for positioning these three types of multi-core ribbon fibers together with a holding member. FIGS. 15A–15B include views showing another positioning member and another holding member.

The characteristic feature of positioning members 101 shown in FIGS. 13 and 14 resides in that each of them has holding portions 101a, 101b, and 101c corresponding in number to the types of the target multi-core ribbon fibers. A positioning member 103 shown in FIGS. 15A–15B is pivotally fixed to a shaft 104, and changes the holding position in accordance with its pivot angle. Thus, this positioning member 103 can be used for multi-core ribbon fibers having any number of cores by changing the pivot angle. In this embodiment, if the angle is preset in accordance with the number of cores, positioning of the multi-core ribbon fiber 1 is completed immediately before a movable member 12 is pivoted to bring the scratching means or the shearing means into contact with the multi-core ribbon fiber 1.

Second Embodiment

Figure 16:
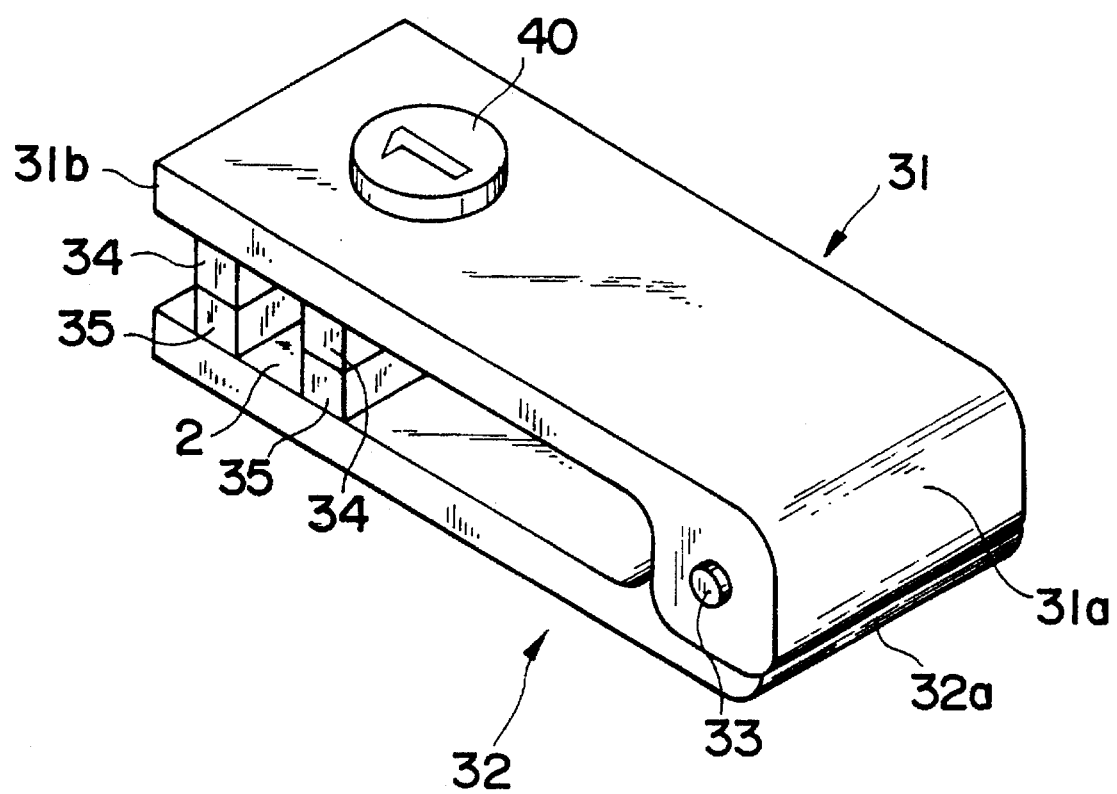
FIG. 16 is a perspective view showing a separating tool according to the second embodiment, FIGS. 17A and 17B include explanatory views showing the internal structure of the separating tool according to the second embodiment, FIGS. 18A to 18C include views showing a modification of the separating tool according to the second embodiment.

A separating tool according to the second embodiment of the present invention will be described with reference to FIGS. 16 to 18A–18C. FIG. 16 is a perspective view showing the separating tool according to the second embodiment, FIGS. 17A–17B include explanatory views showing the internal structure of the separating tool according to the second embodiment, and FIGS. 18A–18C include views showing a modification of this embodiment.

This separating tool is constituted to include a first member 31, a second member 32, and a coupling member 33. The coupling member 33 is arranged at one end portion 31a of the first member 31, and the second member 32 is pivotally and axially mounted through the coupling member 33. A pair of first rectangular members 34 are arranged at the other end portion 31b of the inner surface of the first member 31 to face the second member 32, and a pair of second rectangular members 35 are arranged on the inner surface of the second member 32 opposing the first rectangular members 34. The first and second rectangular members 34 and 35 define the accommodating area 2 in which the multi-core ribbon fiber 1 is accommodated. The gap between the pair of first rectangular members and the gap between the pair of second rectangular members are almost equal to a width L of the multi-core ribbon fiber 1 to be separated (see FIG. 17A).

Figure 17A:
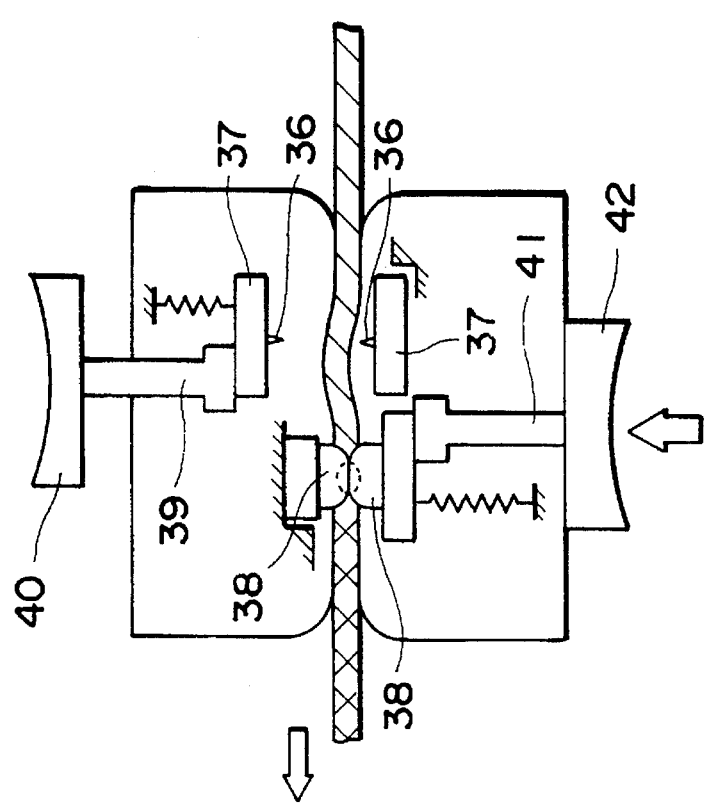
Figure 17B:
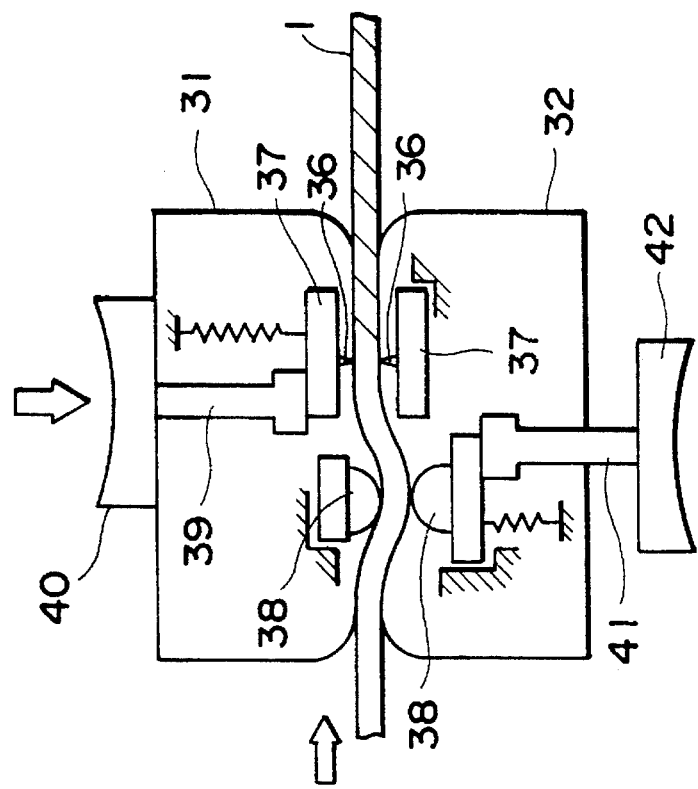

As shown in FIGS. 17A–17B, pin arranging members 37 having scratching pins 36, and shearing members 38 are stored in the first and second members 31 and 32. The pin arranging member 37 mounted to the first member 31 is connected through a first coupling member 39 to a first knob member 40 exposed to the surface of the first member 31. The shearing member 38 mounted to the second member 32 is connected through a second coupling member 41 to a second knob member 42 exposed to the surface of the second member 32. The pin arranging member 37 mounted to the first member 31 is biased by a tension coil spring toward the first knob member 40, and the pin arranging member 37 mounted to the second member 32 is fixed to the second member 32. The shearing member 38 mounted to the second member 32 is biased by a tension coil spring toward the second knob member 42, and the shearing member 38 mounted to the first member 31 is fixed to the first member 31.

For this reason, when the first knob member 40 is depressed toward the multi-core ribbon fiber 1, the scratching pin 36 mounted to the first member 31 is moved downward to form a thrust mark on the common coating of the multi-core ribbon fiber 1 (see FIG. 17A). In this state, when the separating tool is slid along the multi-core ribbon fiber 1, the thrust mark formed by the scratching pin 36 is enlarged, thereby forming a linear scratch in the longitudinal direction of the multi-core ribbon fiber 1.

Subsequently, when the second knob member 42 is depressed toward the multi-core ribbon fiber 1, the shearing member 38 mounted to the second member 32 is moved upward to apply a shearing force along the scratch formed on the common coating of the multi-core ribbon fiber 1 (see FIG. 17B). In this state, when the separating tool is slid along the multi-core ribbon fiber 1, the shearing region of the multi-core ribbon fiber 1 is enlarged, thereby separating the multi-core ribbon fiber 1 in the longitudinal direction.

Figure 18A:
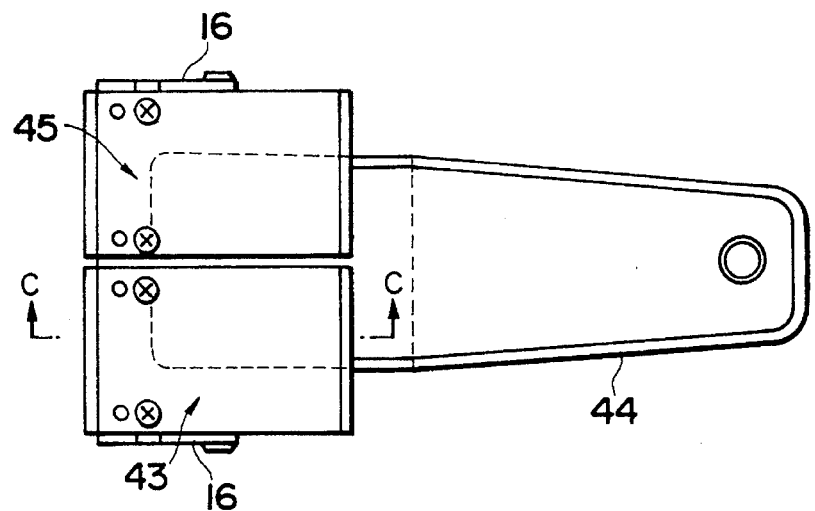
Figure 18B:
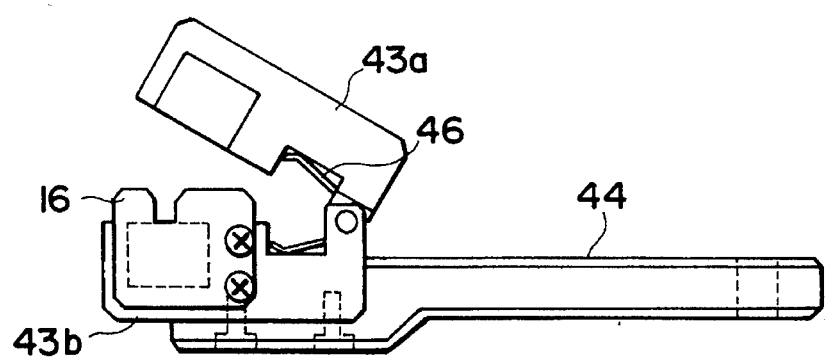
Figure 18C:
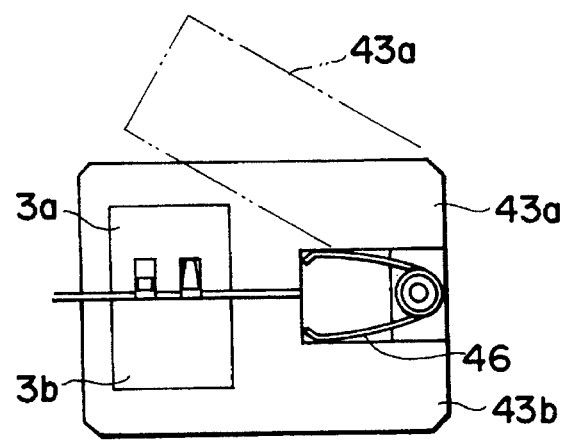
Figure 21:
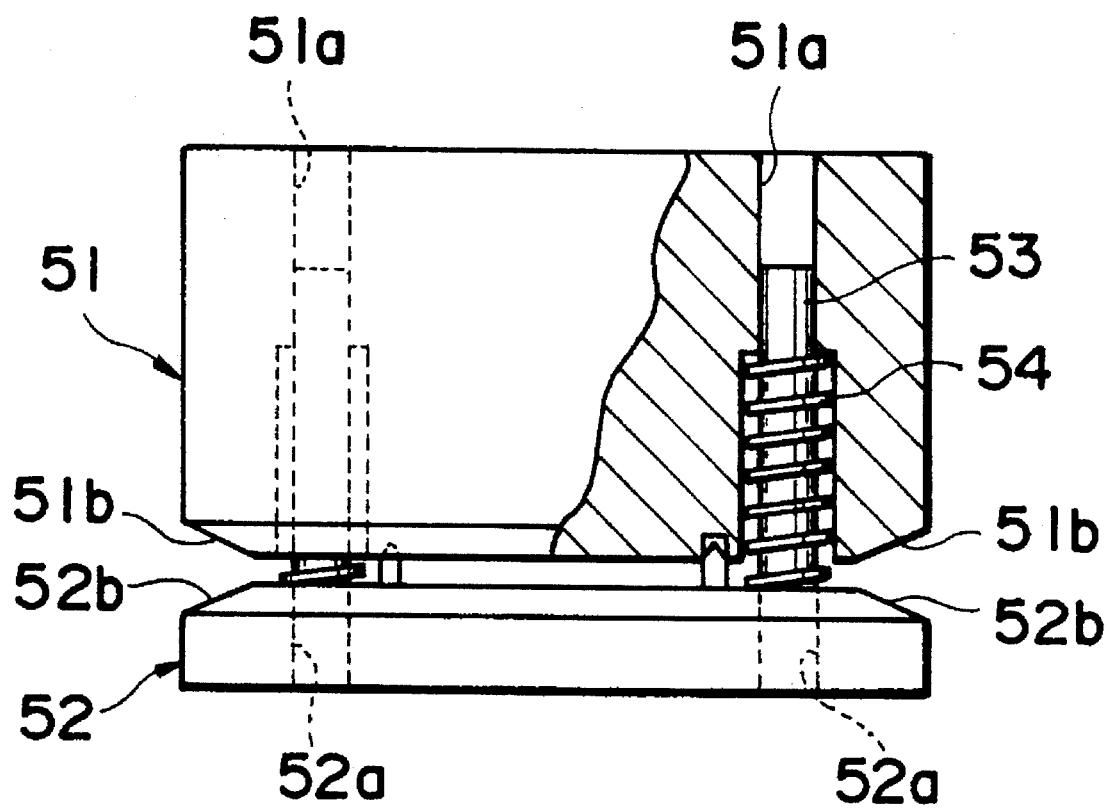
FIG. 21 is a partially sectional view showing the internal structure of the separating tool according to the third embodiment, FIGS. 22A to 22C include step views showing an example of a shearing mechanism that can be applied to the separating tool according to the third embodiment, FIGS. 23A to 23C include views showing the mounting structure of a shearing member used in the shearing mechanism of FIGS. 22A to 22C and and a timing chart of the same, FIGS. 24A and 24B include step views showing another shearing mechanism that can be used in the separating tool according to the third embodiment, FIGS. 25A and 25B include views showing a shearing member that can be used in the shearing mechanism of FIGS. 24A and 24B.

A modification of this embodiment will be described with reference to FIGS. 18A–18C. FIG. 18A is a plan view of a separating tool according to this modification, FIG. 18B is a side view of the separating tool according to this modification, and FIG. 18C is a longitudinal sectional view taken along the plane (C—C) extending through a spring 46 and shows a state wherein upper and lower members are mated.

This separating tool is constituted to include a scriber body (scratching means) 43, a grip 44, a cutter body (shearing force applying means) 45, and the spring 46. An upper scriber block 3a identical to that described above is buried in an upper member 43a of the scriber body 43, and a lower scriber block 3b is buried in a lower member 43b of the scriber body 43 at a position to correspond to the upper scriber block 3a. An upper cutter block 5a identical to that described above is buried in an upper member 45a of the cutter body 45, and a lower cutter block 5b is buried in a lower member 45b of the cutter body 45 at a position to correspond to the upper cutter block 5a. The grip 44 fixes the scriber body 43 and the cutter body 45 with screws or the like. The spring 46 maintains the upper members 43a and 45a and the lower members 43b and 45b in an open state at a predetermined angle. A substantially U-shaped member 16 is fixed to one side surface of the lower member 43b of the scriber body 43 with a screw or the like, and another substantially U-shaped member 16 is fixed to the other side surface of the lower member 45b of the cutter body 45 with a screw or the like (see FIGS. 18A and 18B).

When a multi-core ribbon fiber 1 is inserted through the openings of the substantially U-shaped members 16, it is positioned within a fiber accommodating area (not shown). In this state, when the operator depresses the upper member 43a of the scriber body 43 with his thumb or the like, a thrust mark is formed on the multi-core ribbon fiber. When the separating tool is moved in the longitudinal direction of the multi-core ribbon fiber while maintaining this state, a scriber line is formed. Subsequently, the separating tool is arranged along this scriber line, and the upper member 45a of the cutter body 45 is depressed, thereby applying a shearing force along the scriber line. Since the functions and operations of the scriber body 43 and the cutter body 45 are as described above (see FIGS. 17A–17B), a detailed description thereof will be omitted.

Third Embodiment

Figure 22A:
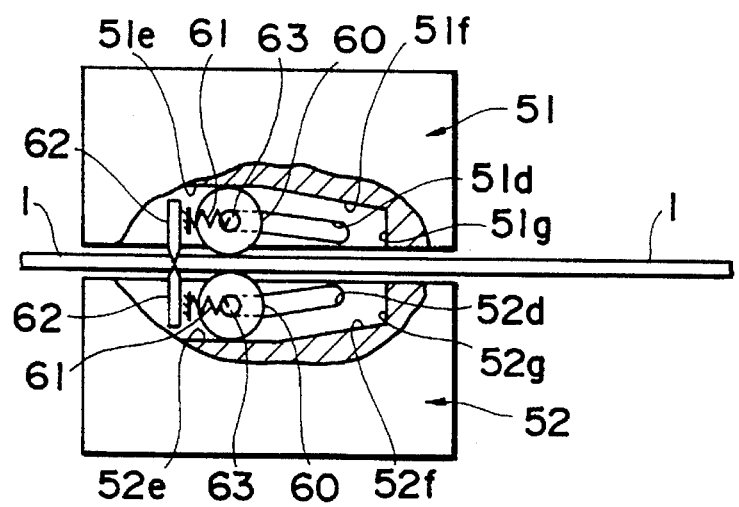
Figure 22B:
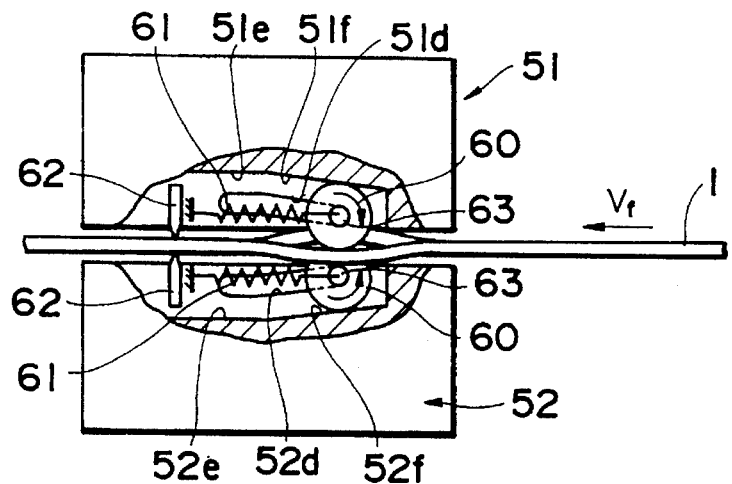
Figure 22C:
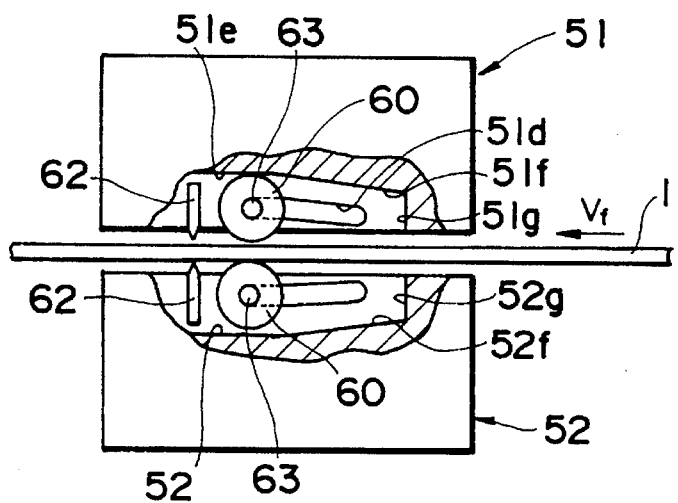
Figure 23A:
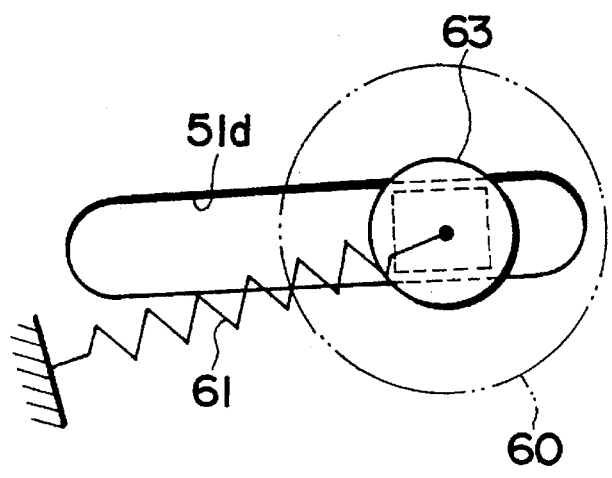
Figure 23B:
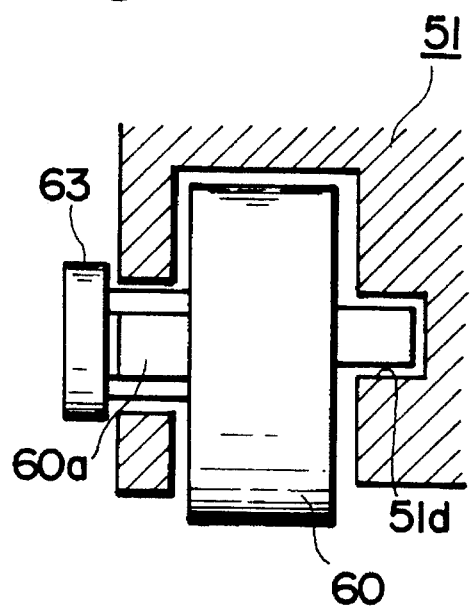
Figure 23C:
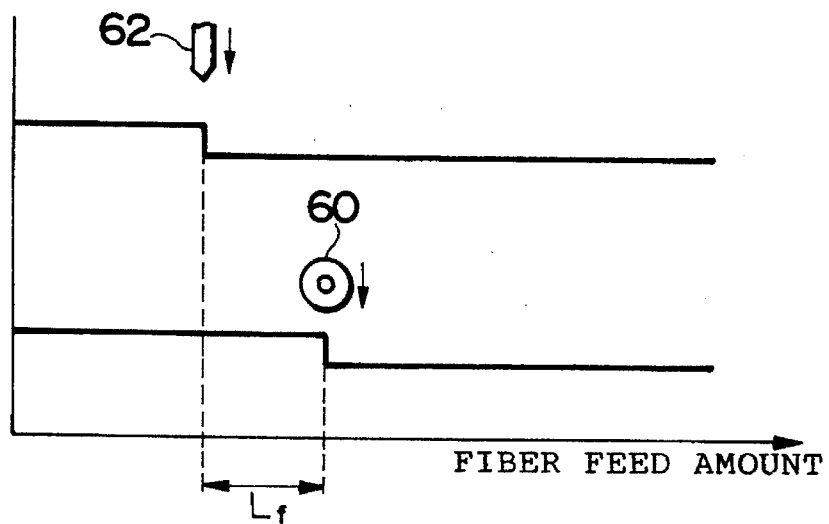
Figure 24A:
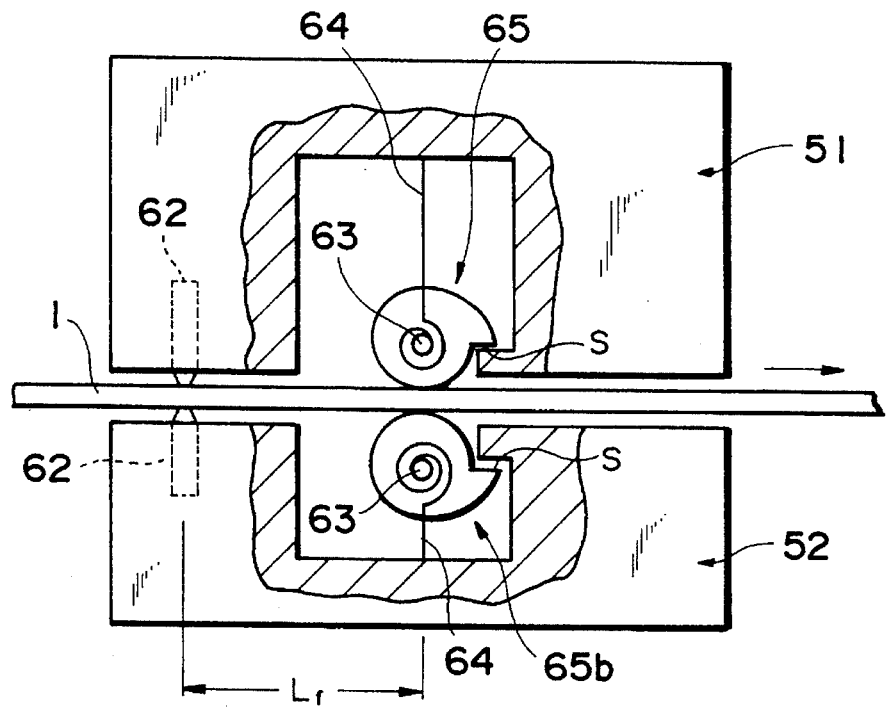
Figure 24B:
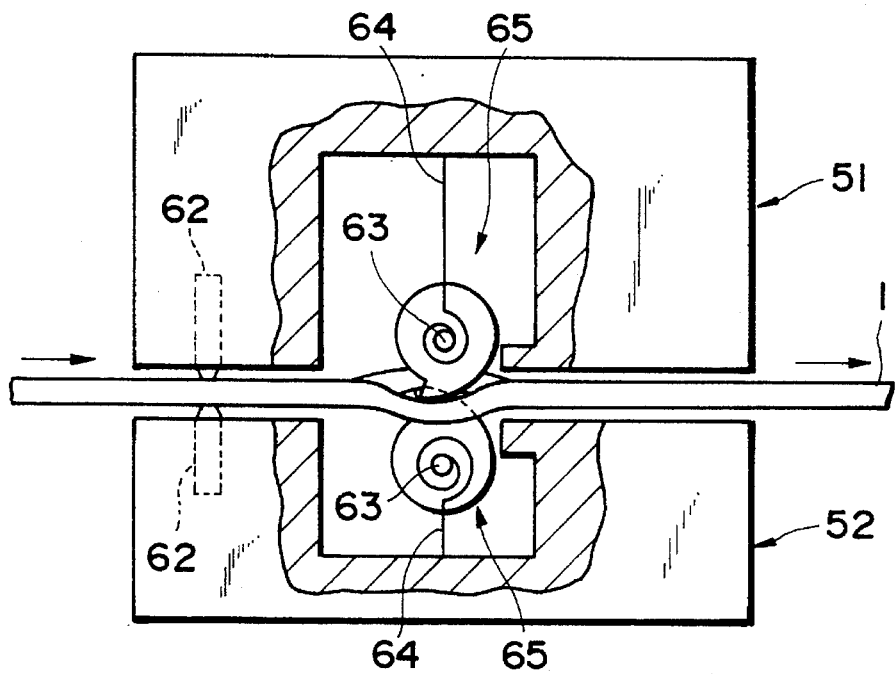
Figure 25A:
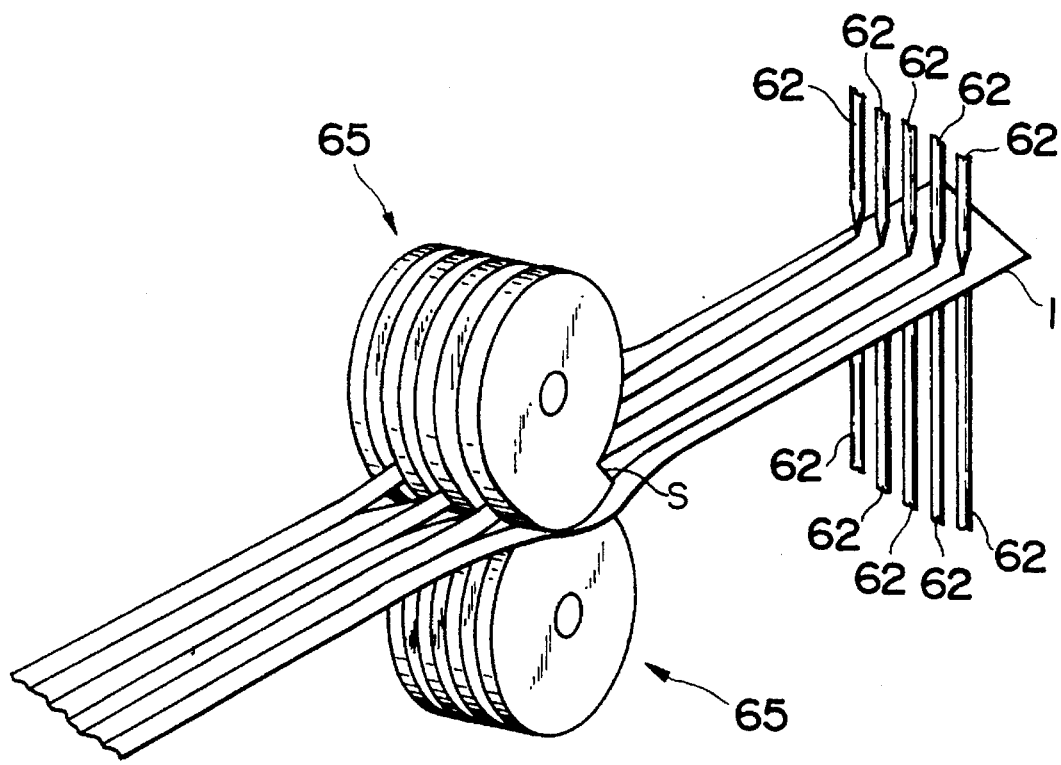
Figure 25B:
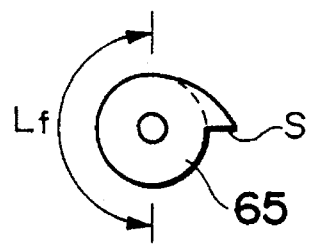

A separating tool according to the third embodiment of the present invention will be described with reference to FIGS. 19 to 25A–25B. FIG. 19 is a perspective view showing the outer appearance of the separating tool according to the third embodiment; FIGS. 20A–20B include views showing the outer appearance of this separating tool; FIGS. 22A–22C include partially sectional views showing the internal structure of the separating tool according to the third embodiment; FIGS. 23A–23C include views showing the mounting structure of a roller type shearing member in detail and a timing chart thereof; and FIGS. 24A–24B and 25A–25B include views showing another mounting structure using a spiral shearing member.

This separating tool is constituted to include an upper member 51, a lower member 52, coupling members 53, and a fiber positioning member 56. Holes 51a are formed at the two end portions of the upper member 51 to extend from the upper surface to the lower surface of the upper member 51. Similarly, stepped holes 51a having two different inner diameters are formed at the two end portions of the lower member 52 to extend from the upper surface to the lower surface of the lower member 52. The coupling members 53 are inserted in these holes 51a and 52a through compression coil springs 54. As a result, the upper member 51 is separated from the lower member 52 by a predetermined gap. This gap can be decreased by depressing the upper member 51 against the biasing force. Scratching pins 55 are mounted on the lower surface of the upper member 51. For this reason, after a multi-core ribbon fiber 1 is inserted between the upper and lower members 51 and 52 and positioned in the accommodating area, when the upper member 51 is depressed toward the lower member 52, the scratching pins 55 form thrust marks on a common coating 1b of the multi-core ribbon fiber 1. In this state, when this separating tool is moved in the longitudinal direction of the multi-core ribbon fiber 1, the thrust marks are enlarged.

The fiber positioning member 56 is mounted at the fiber inserting portion of this separating tool. The fiber positioning member 56 is constituted to include a lid member 56a having an inclined distal end, a shaft 56b for pivotally and axially mounting the lid member 56a, and a holding member 56c for holding a closed state wherein the lid member 56a closes the fiber inserting portion. A receptacle portion 51c is formed in the upper member 51 to have a shape matching with the inclined portion of the lid member 56a. When the upper member 51 is moved downward against the compression coil springs 54, the receptacle portion 51c is engaged with the inclined portion of the lid member 56a. As a result, the lid member 56a can be positioned at high precision with respect to the upper and lower members 51 and 52. Positioning is executed immediately before the scratching pins 55 are brought into contact with the common coating 1b of the multi-core ribbon fiber 1. Thus, thrust marks are formed at desired positions of the common coating 1b of the multi-core ribbon fiber 1 at high precision, and the optical fibers are prevented from accidentally projecting during a scratching or shearing operation.

An example of the mounting structure of a shearing member that can be applied to this embodiment will be described with reference to FIGS. 22A–22C and 23A–23C. This mounting structure uses roller type shearing members as the shearing force applying means and employs guide grooves and walls and tension coil springs, thereby applying a shearing force along a scriber line formed by a scriber means. Thus, this mounting structure is constituted to include roller type shearing members 60, guide grooves 51d and 52d, guide walls 51f and 52f, and tension coil springs 61.

Applying mechanisms for applying a shearing force by using the roller type shearing members 60 are housed in the mechanism housing portions of the upper and lower members 51 and 52. The mechanism housing portions are arranged to sandwich the fiber accommodating area. The upper limit of the mechanism housing portion of the upper member 51 is defined by a horizontal wall 51e, the inclined wall 51f, and a vertical wall 51g. Similarly, the lower limit of the mechanism housing portion of the lower member 52 is defined by a horizontal wall 52e, the inclined wall 52f, and a vertical wall 52g. The roller type shearing members 60 are mounted to be pivotal about caps 63 through roller shafts 60a (see FIG. 23B).

One end of each roller shaft 60a is engaged with the elongated guide groove 51d formed in the side wall of the upper member 51, and the other end of each roller shaft 60a is engaged with the corresponding cap 63. The caps are pulled by the tension coil springs 61 toward scratching means 62. The guide grooves 51d are arranged such that they are closer to the fiber accommodating area as they are separated from the scratching means. Each guide groove 51d has an inclination to guide the corresponding roller shaft 60a such that a shearing force capable of sufficiently shearing the common coating of the multi-core ribbon fiber 1 arranged in the fiber accommodating area can be applied when the roller type shearing member 60 is farthest from the scratching means 62.

The operation of the shearing mechanism will be described with reference to FIGS. 22A–22C by using the roller type shearing members 60. In a normal state, the roller type shearing members 60 are closest to the scratching means 62 due to the tension coil springs 61 (see FIG. 22A). When the multi-core ribbon fiber 1 is inserted between the pair of roller type shearing members 60 and the upper member 51 is urged by the lower member 52, the scratching means 62 form marks on the common coating of the multi-core ribbon fiber 1. When the multi-core ribbon fiber 1 is further fed, the roller type shearing member 60 of the upper member 51 is rotated due to frictional contact with the multi-core ribbon fiber 1, the guide wall 51e, and the inclined wall 51f. Simultaneously, the roller type shearing member 60 of the lower member 52 is rotated due to frictional contact with the multi-core ribbon fiber 1, the guide wall 52e, and the inclined wall 52f, and is moved away from the scratching means 62 against the biasing force of the tension coil spring 61. In this case, the thrust marks formed by the scratching means 62 are enlarged in the longitudinal direction of the multi-core ribbon fiber 1. When the multi-core ribbon fiber 1 is fed to a certain degree and the scratched portions thereof are brought into contact with the roller type shearing members 60, the pair of roller type shearing members 60 overlap. As a result, the common coating of the multi-core ribbon fiber 1 is sheared off by the roller type shearing members 60 (see FIG. 22B). When a force for urging the upper member 51 against the lower member 52 is removed, the upper member 51 is moved away from the lower member 52 due to the operation of the compression coil springs 54. As a result, the roller type shearing members 60 are separated from the multi-core ribbon fiber 1, and the roller type shearing members 60 move in the guide grooves 51d by the operation of the tension coil springs 61 to be close to the scratching means 62 (see FIG. 22C).

According to this embodiment, when a predetermined period of time has elapsed after the scratching means 62 scratch the common coating of the multi-core ribbon fiber 1, the pair of roller type shearing members 60 are brought into contact with the multi-core ribbon fiber 1, and as a result a shearing force is applied to the multi-core ribbon fiber 1. For example, a delay time Tf of application of the shearing force satisfies Tf=(Lf/Vf) where Vf is the feed speed of the multi-core ribbon fiber 1 and Lf is the gap between the scratching means 62 and the roller type shearing members 60 (see FIG. 23C).

Another shearing mechanism that can be applied to the separating tool according to the third embodiment will be described with reference to FIGS. 24 and 25. This shearing mechanism has a characteristic feature in that it employs spiral shearing members 65 and spiral springs 64.

Each spiral shearing member 65 is constituted to include a plate cam which has a stopper S and a profile a radius of which is increased at a predetermined rotational angle (90°) immediately before the stopper S. The spiral shearing member 65 mounted to an upper member 51 is rotatably held through a shaft 63 supported by the side plate of the upper member 51 of the mechanism housing portion, and is biased by the spiral spring 64 to rotate counterclockwise. The spiral shearing member 65 mounted to a lower member 52 is rotatably held by a shaft 63 supported by the side plate of the lower member 52 of the mechanism housing portion, and is biased by the spiral spring 64 to rotate clockwise. Scratching means 62 are arranged at a gap Lf from the corresponding spiral shearing members 65 and apply a shearing force along a plurality of scriber lines formed by the scratching means 62. Thus, the length of the semicircle of each spiral shearing member 65 is equal to the gap Lf (see FIG. 25B), and individual plate cams are arranged at predetermined gaps with each other.

The operation of this shearing mechanism will be described. The spiral shearing members 65 are arranged on the two sides of a multi-core ribbon fiber 1 to contact it (see FIG. 24A). When the multi-core ribbon fiber 1 is fed out, the spiral shearing member 65 mounted to the upper member 51 is rotated counterclockwise by frictional contact, and the spiral shearing member 65 mounted to the lower member 52 is rotated clockwise by frictional contact. When rotation proceeds to a certain degree, the distal end portion of one spiral shearing 65 overlaps the distal end portion of the other shearing member, thereby applying a shearing force to the common coating of the multi-core ribbon fiber 1 (see FIGS. 24B and 25A).

Fourth Embodiment

Figure 26:
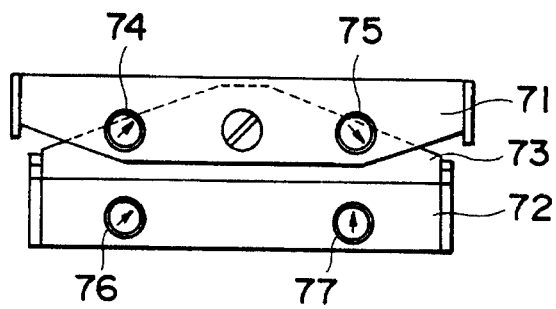
FIG. 26 is a side view showing the outer appearance of a separating tool according to the fourth embodiment, FIGS. 27A and 27B include views showing the outline of a scratching pin selecting mechanism of the separating tool according to the fourth embodiment, FIGS. 28A to 28G include views schematically showing a divisional state that can be obtained by using the scratching pins and the shearing member of the separating tool according to the fourth embodiment.
Figure 27A:
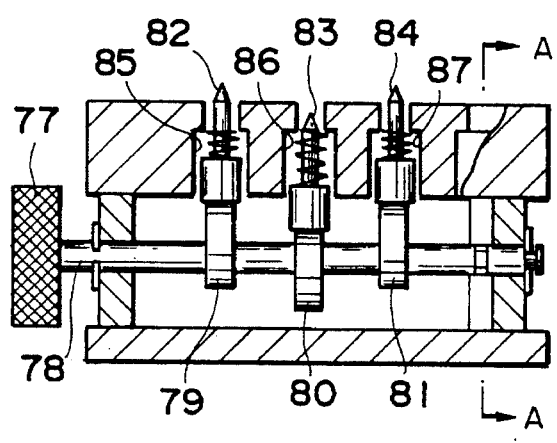
Figure 27B:
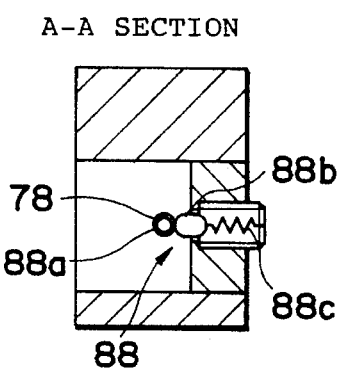
Figure 28A:
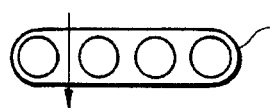
Figure 28E:
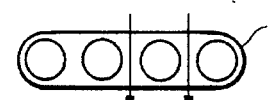
Figure 28B:
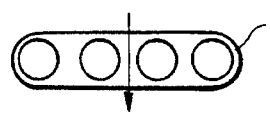
Figure 28F:
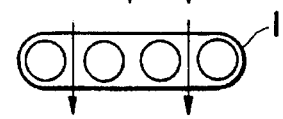
Figure 28C:
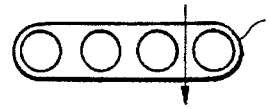
Figure 28G:
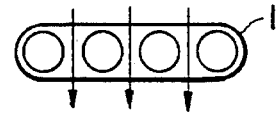
Figure 28D:
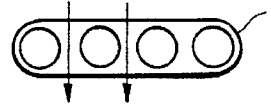
Figure 29:
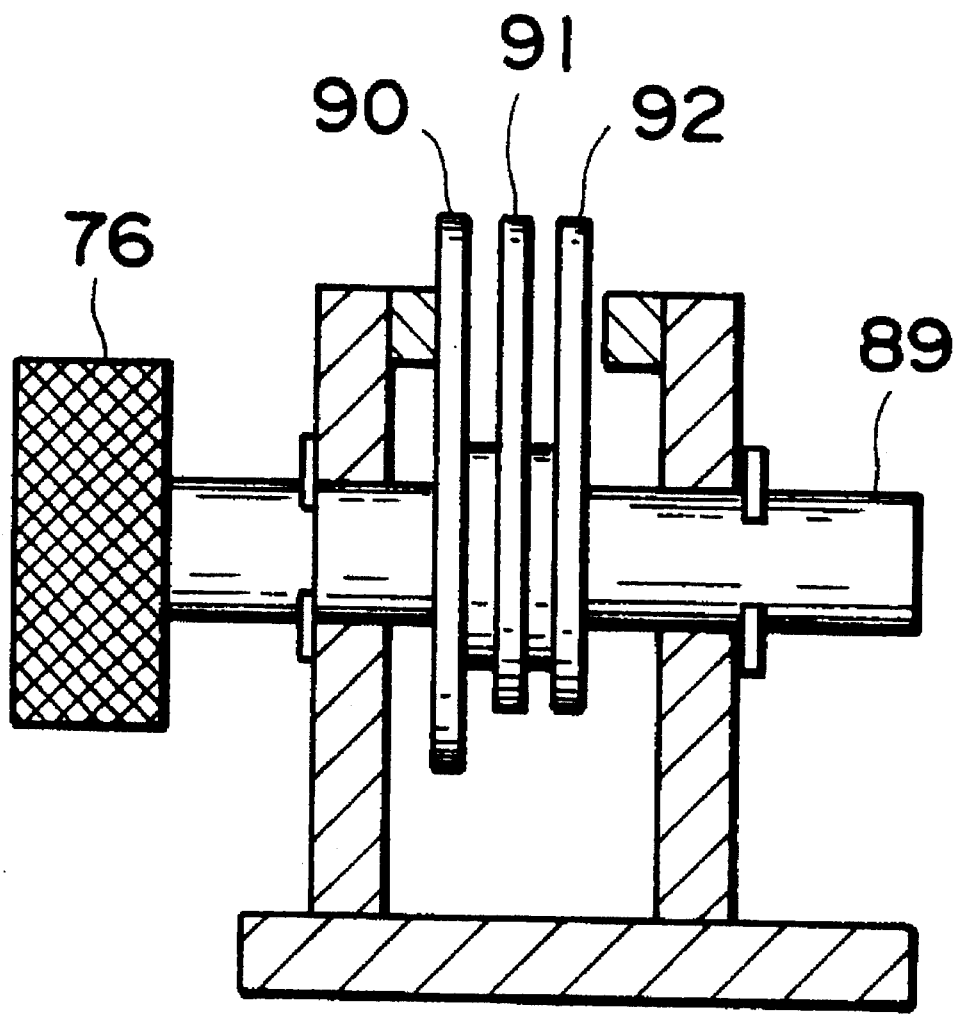
FIG. 29 is a view showing the outline of a shearing member selecting mechanism that can be applied to the fourth embodiment, FIGS. 30A to 30C include views showing the profiles of a plate cam type shearing member used as a plate cam/shearing member selecting mechanism used by the scratching pin selecting mechanism, FIGS. 31A to 31D include partially sectional views schematically showing a separating tool according to the fifth embodiment, and FIGS. 32A to 32D include partially sectional views schematically showing the separating tool according to the sixth embodiment.
Figure 30A:
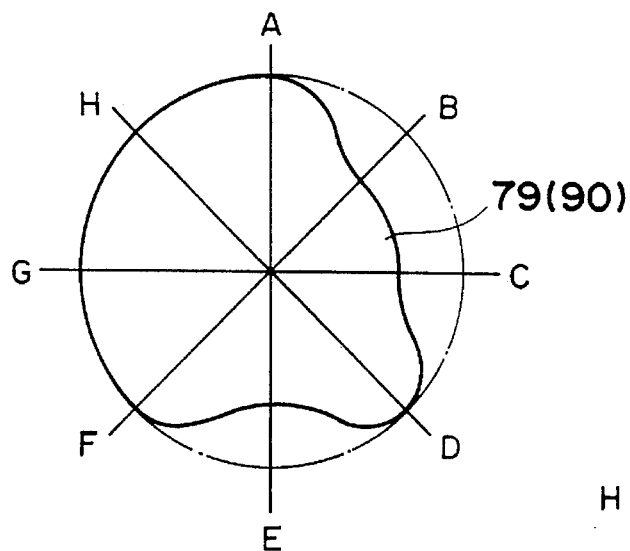
Figure 30B:
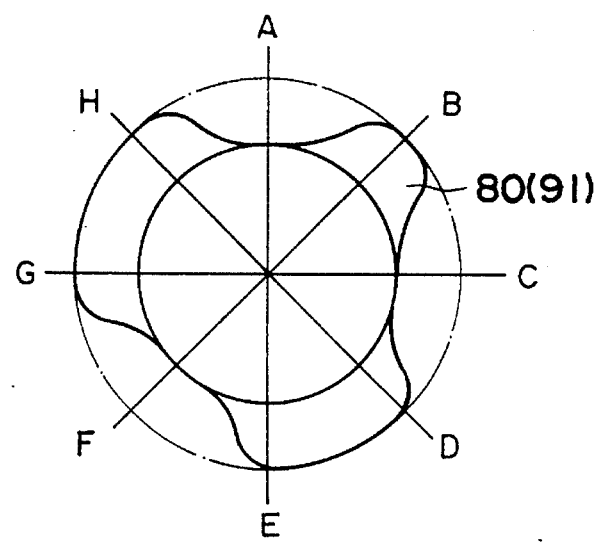
Figure 30C:
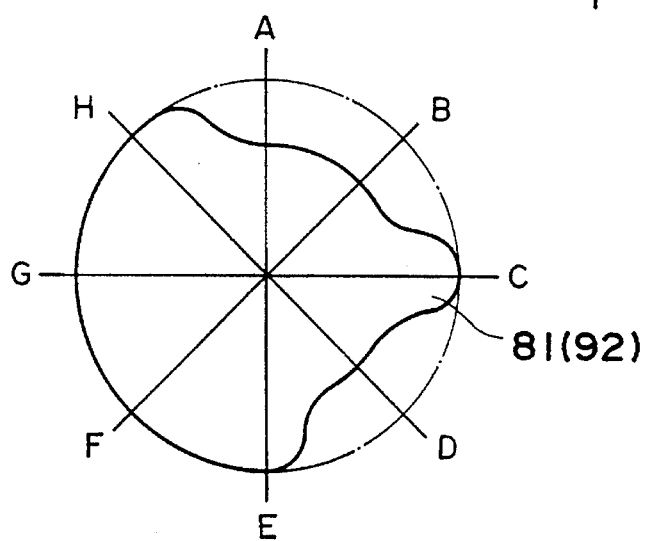

A separating tool according to the fourth embodiment of the present invention will be described with reference to FIGS. 26 to 30A–30C. FIG. 26 is a view showing the outer appearance of the separating tool according to the fourth embodiment; FIGS. 27A–27B include views showing the outline of the scratching pin selecting mechanism of the separating tool according to this embodiment; FIGS. 28A–28G include views schematically showing a divisional state which can be obtained by using the scratching pins and shearing members of the separating tool according to this embodiment; FIG. 29 is a view showing the outline of a shearing member selecting mechanism that can be applied to this embodiment; and FIGS. 30A–30C include views showing examples of the profile of a plate cam type shearing member used as a mechanism for selecting a plate cam and a shearing member which is used by the scratching pin selecting mechanism.

This separating tool is constituted to include a first member 71, a second member 72, and a side plate 73 (see FIG. 26). Dial type knob members 74, 75, 76, and 77 are arranged on the front surfaces of the first and second members 71 and 72. A desired pin or shearing member can be projected by rotating these dial type knob members 74, 75, 76, and 77. In this embodiment, the dial type knob members 75 and 77 are used for operating the scratching pins, and the dial type knob members 74 and 76 are used to operate the shearing members. For example, the dial type knob member 77 is connected to a rotation shaft 78, plate cams 79, 80, and 81, and scratching pins 82, 83, and 84 serving as the followers of the plate cams 79 to 81. These scratching pins 82 to 84 are housed in guide holes 85, 86, and 87 formed toward an accommodating area and biased by springs toward the corresponding cams, so that they are vertically moved in accordance with rotation of the plate cams 79 to 81. When the plate cams 79 to 81 are moved upward, the corresponding pins project above the accommodating area. Accordingly, if the arrangement pattern of the pins is displayed by the dial type knobs 74 to 77, a desired pin arrangement can be realized easily. Also, this embodiment has a rotational angle holding means 88 for fixing the rotation shaft 78 at predetermined unit angles (e.g., 60° angular pitch). The rotational angle holding means 88 is constituted to include a first engaging portion 88a formed at an intermediate portion of the rotation shaft 78 to have a hexagonal shape, a second engaging portion 88b engaged with the first engaging portion 88a, and a biasing means 88c for biasing the second engaging portion 88b toward the first engaging portion 88a. To realize seven divisional state patterns (FIGS. 28A to 28G), the plate cam 79 having the profile shown in FIG. 30A, the plate cam 80 having the profile shown in FIG. 30B, and the plate cam 81 having the profile shown in FIG. 30C may be used.

The shearing member selecting mechanism will be described with reference to FIG. 29. This shearing member selecting mechanism has a similar mechanism to that of the scratching pin selecting mechanism. For example, the dial type knob member 76 is connected to a rotation shaft 89 having plate cams 90, 91, and 92. The circumferential surfaces of the plate cams 90, 91, and 92 form shearing blades which are partly exposed from the accommodating area in accordance with the rotational angle. To realize the divisional state shown in FIGS. 28A–28G, plate cam type shearing blades having the profiles shown in FIGS. 30A, 30B, and 30C may be used as the plate cams 90, 91, and 92, respectively. As the plate cam type shearing blade to be mounted on the first member 71, corresponding plate cams may be formed to serve as the shearing member (see FIGS. 9 and 11A–11B) described in the second embodiment.

Fifth Embodiment

A separating tool according to the fifth embodiment of the present invention will be described with reference to FIGS. 31A–31D. FIGS. 31A–31D include partially sectional views schematically showing the separating tool according to the fifth embodiment.

This separating tool is characterized in that shearing processing is automated by using a guide rail, and is constituted to include a first member 93, a second member 94, and a rail member 95. Scratching pins 18 having a structure similar to that described above can be used. Shearing members 96 are respectively mounted to the first and second members 93 and 94, and these shearing members 96 are respectively in contact with an L-shaped first lever 97 and a U-shaped second lever 98. These levers 97 and 98 are held such that one end portion of each thereof is urged against the rail member 95 by tension coil springs 99. The shearing member 96 is supported by the other end portion of each of the levers 97 and 98 (FIG. 31A). When one end portion of each of the levers 97 and 98 falls in a corresponding groove 95a formed in part of the rail member 95, the shearing members 96 are urged against a multi-core ribbon fiber 1 by the other end portion of each of the levers 97 and 98 (see FIG. 31B). As a result, a shearing force is generated in the multi-core ribbon fiber 1. Note that clampers 100 are arranged on the two sides of the multi-core ribbon fiber 1, and the multi-core ribbon fiber 1 is held by the clampers 100 with a predetermined force. In this embodiment, the shearing members 96 are moved in an interlocked manner with fall of the levers 97 and 98 in the grooves 95a. However, this movement can be realized when the levers 97 and 98 escape from the grooves. These operations can be easily realized by altering the internal mechanism. As the mechanism of this type is known, a description thereof will be omitted.

The separating procedure of the separating tool according to this embodiment will be described. First, the separating tool is moved to the origin, the multi-core ribbon fiber 1 is clamped by the clampers 100, and the separating tool is closed (see FIG. 31A). Then, the separating tool is slid along the guide rail member 95, thereby moving the separating tool along the multi-core ribbon fiber 1. The cam lever 97 of the separating tool is in contact with the rail member 95, and the cam lever 97 falls in the groove 95a during its movement. Thus, shearing separation is automatically started at a desired position only by moving the separating tool along the rail member 95 (FIG. 31B). When separation is completed, the separating tool is opened, and the separated multi-core ribbon fiber 1 is removed from the clampers 100.

Sixth Embodiment

A separating tool according to the sixth embodiment of the present invention will be described with reference to FIGS. 32A–32D. FIGS. 32A–32D include views showing the process of the function of the separating tool according to the sixth embodiment.

This embodiment is constituted to include a rubber roller 110, a wedge-shape member 111, a movable shaft 112, a shearing member 113, a rubber roller pressing portion 114, and a compression coil spring 115. The wedge-shape member 111 is guided along a guide wall 116 arranged along a multi-core ribbon fiber 1, and is biased by the compression coil spring 115 mounted at its end in a direction to separate from the rubber roller pressing portion 114. The rubber roller 110 is rotatably mounted at the distal end of the wedge-shape member 111, and is regulated by the rubber roller pressing portion 114 to move only in the horizontal direction. The rubber roller 110 contacts the multi-core ribbon fiber 1 and the rubber roller pressing portion 114, and moves along the rubber roller pressing portion 114 as it is rotated in accordance with the moving amount of the multi-core ribbon fiber 1. The shearing member 113, rotatably mounted to the movable shaft 112 which is movable only in a direction substantially perpendicular to the plane of arrangement of the multi-core ribbon fiber 1, is arranged at an intermediate portion of the wedge-shape member 111. The shearing member 113 has a disk-like shape, and its peripheral edge forms a shearing blade. The shearing member 113 serves as a kind of a follower with respect to the wedge-shape member 111, and is moved in a direction perpendicular to the moving direction of the wedge-shape member 111. A scratching means 62 for forming a scriber line in the multi-core ribbon fiber 1 is arranged upstream the shearing member 113 (the left side in FIGS. 32A–32D) with respect to the feed direction of the multi-core ribbon fiber 1.

Figure 32A:
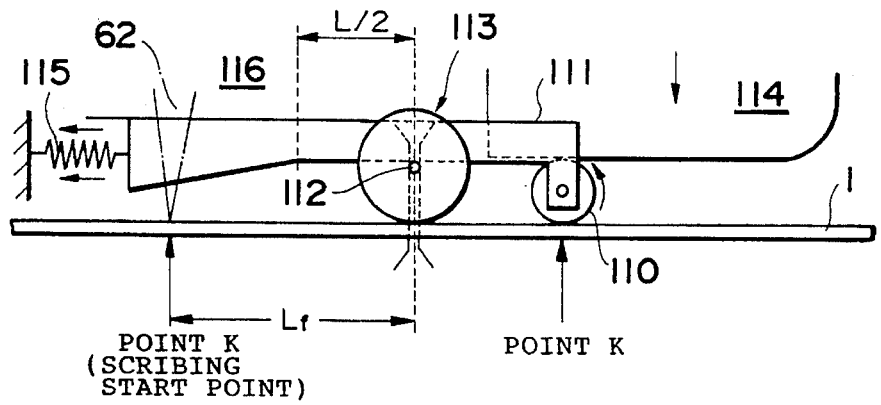
Figure 32B:
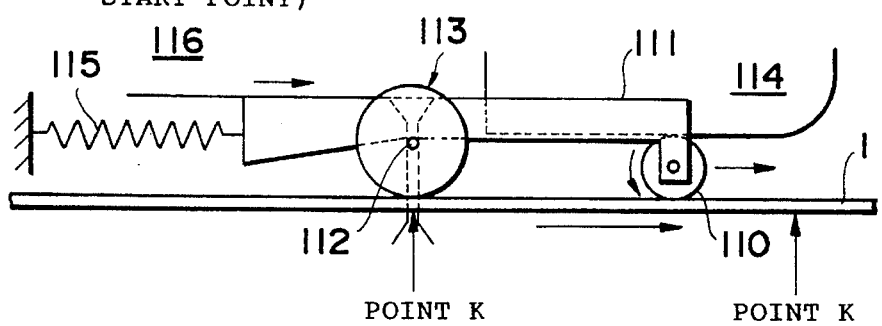
Figure 32C:
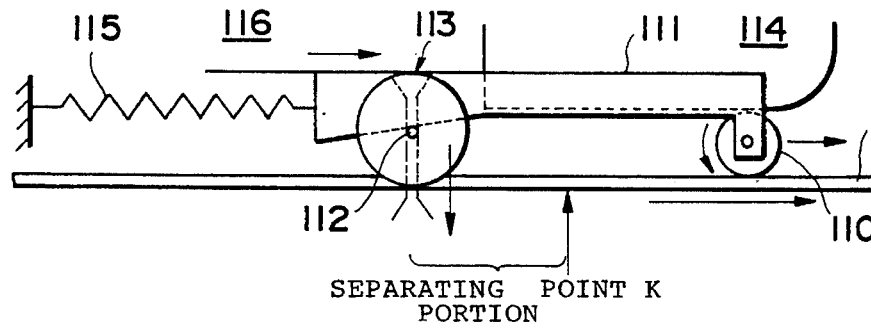
Figure 32D:
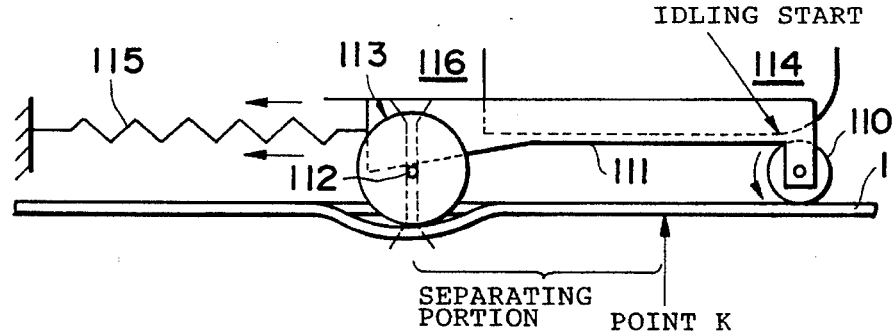

When the multi-core ribbon fiber 1 is fed and the scribing start point of the scratching means 62 reaches a position immediately under the shearing member 113 (when the multi-core ribbon fiber 1 has moved by Lf), the inclined portion of the wedge-shape member 111 starts to press the shearing member 113 downward (see FIG. 32B). Shearing of the common coating of the multi-core ribbon fiber 1 is started at this time point. When the rubber roller 110 is further moved forward, the shearing member 113 is pressed further downward (see FIG. 32C). When the rubber roller 110 reaches the end portion of the rubber roller pressing portion 114, the rubber roller 110 starts idling, and the shearing member 113 continues rotation at the predetermined position (see FIG. 32D). Since the multi-core ribbon fiber 1 continues to move forward, the rubber roller 110 continues idling despite that it is pulled to the left by a spring force, and does not return to the origin (point K'). When the multi-core ribbon fiber 1 is extracted, the rubber roller 110 and the wedge-shape member 111 return to the origin.

The separating apparatus according to this embodiment can automatically form a scriber line in the common coating of the multi-core ribbon fiber 1 by moving the multi-core ribbon fiber 1, and can divide the multi-core ribbon fiber 1 along this scriber line in a desired divisional state.

The embodiments and modifications of the separating tool according to the present invention have been described. The present invention is not limited to these embodiments.

For example, the components that can be used in the first embodiment can be basically used in other embodiments.

As the scratching means described above, one that can be detachable from the arrangement regulating means 4 is described as an example. A large number of scratching means having various types of patterns may be prepared in advance, and they may be fixed to an arrangement regulating means 4 to provide an integral structure. Also, a scratching means and an arrangement regulating means may be vertically arranged to sandwich the fiber accommodating area 2 in order to assure scratching.

Since the present invention has the above arrangement, it can separate a multi-core ribbon fiber into an arbitrary number of optical fibers with any divisional state.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.262537/1993 filed on Oct. 20, 1993 is hereby incorporated by reference.

What is claimed is:

1. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a cutter for forming a scratch in a longitudinal direction of said multi-core ribbon fiber between optical fibers on a surface of the common coating of the multi-core ribbon fiber held by said fiber holder;

an arrangement holder for holding said cutter and defining an arranging state of said cutter; and a shearing force applying member for applying a shearing force to the multi-core ribbon fiber along the scratch after the scratch is formed on the surface of the common coating of the multi-core ribbon fiber by said cutter.

2. A separating tool for a multi-core ribbon fiber according to claim 1, wherein said container has a member for positioning one side of the multi-core ribbon fiber in a direction along which the optical fibers are arranged, and said fiber holder holds the other side of the multi-core ribbon fiber in the direction along which the optical fibers are arranged.

3. A separating tool for a multi-core ribbon fiber according to claim 2, wherein said fiber holder movably holds the multi-core ribbon fiber in the containing area before a separating operation, and holds the multi-core ribbon fiber at a predetermined position immediately before said cutter forms a scratch on the common coating of the multi-core ribbon fiber, and said fiber holder movably holds the multi-core ribbon fiber in the containing area before the separating operation, and holds the multi-core ribbon fiber at a predetermined position immediately before said shearing force applying member shears the common coating of the multi-core ribbon fiber.

4. A separating tool for a multi-core ribbon fiber according to claim 3, wherein said fiber holder has a holding portion at a different holding position corresponding to the other side of the multi-core ribbon fiber in accordance with a number of cores.

5. A separating tool for a multi-core ribbon fiber according to claim 1, wherein said cutter is constituted to have a shape suitable for forming a scratch on the common coating of the multi-core ribbon fiber and for enlarging the formed scratch.

6. A separating tool for a multi-core ribbon fiber according to claim 1, wherein said arrangement holder has a plurality of mounting portions for detachably mounting said cutter, and a scratch position of the multi-core ribbon fiber is changed by mounting said cutter at a predetermined mounting portion in accordance with a divisional state of the multi-core ribbon fiber.

7. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a cutter for forming a scratch in said multi-core ribbon fiber on a surface of the common coating of the multi-core ribbon fiber held by said fiber holder;

an arrangement holder for holding said cutter and defining an arranging state of said cutter;

a plurality of shearing blades disposed in a comb-like shape constructed and arranged to apply a shearing force to the multi-core ribbon fiber along the scratch after the scratch is formed on the surface of the common coating of the multi-core ribbon fiber by said cutter; and a plurality of groove members constructed and arranged to mesh with said shearing blades.

8. A separating tool for a multi-core ribbon fiber according to claim 7, wherein said plurality of shearing blades are arranged in accordance with at least a divisional state of the multi-core ribbon fiber in which the plurality of optical fibers are arranged.

9. A separating tool for a multi-core ribbon fiber according to claim 8, wherein said shearing force applying member has biasing means for biasing said plurality of shearing blades in a direction perpendicular to the optical fiber arrangement plane.

10. A separating tool for a multi-core ribbon fiber according to claim 9, wherein said biasing means has a biasing force which does not damage the multi-core ribbon fiber before being scratched by said cutter, and which applies an effective shearing force to the multi-core ribbon fiber after being scratched by said cutter.

11. A separating tool for separating a multi-core ribbon fiber having a plurality of optical fibers arranged in a plane and integrated with a common coating, the separating tool comprising:

fiber accommodating means for accommodating the multi-core ribbon fiber in an accommodating area;

fiber holding means for holding the multi-core ribbon fiber in the accommodating area;

scratching means for forming a scratch in a longitudinal direction of said multi-core ribbon fiber between optical fibers on a surface of the common coating of the multi-core ribbon fiber held by said fiber holding means;

arrangement defining means for holding said scratching means and defining an arranging state of said scratching means; and a shearing force applying means for applying a shearing force to the multi-core ribbon fiber along the scratch after the scratch is formed on the surface of the common coating of the multi-core ribbon fiber by said scratching means.

12. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a cutter for forming a scratch in said multi-core ribbon fiber on a surface of the common coating of the multi-core ribbon fiber held by said fiber holder;

an arrangement holder for holding said cutter and defining an arranging state of said cutter, said arrangement holder comprising:

a plate cam using said cutter as a follower, a profile of said plate cam being defined in accordance with a divisional state of the multi-core ribbon fiber;

a shaft for holding said plate cam;

a holder for holding said shaft at a predetermined rotational position; and a knob member for rotating said shaft thereby changing a scratch position of the multi-core ribbon fiber; and a shearing force applying member for applying a shearing force to the multi-core ribbon fiber along the scratch after the scratch is formed on the surface of the common coating of the multi-core ribbon fiber by said cutter.

13. A separating tool for separating a multi-core ribbon fiber having a plurality of optical fibers arranged in a plane and integrated with a common coating, the separating tool comprising:

a base member;

a fiber container disposed on said base member for containing the multi-core ribbon fiber in an containing area;

a fiber holder for holding the multi-core ribbon fiber in the containing area;

a cutter disposed on the base member for forming a scratch in said multi-core ribbon fiber on a surface of the common coating of the multi-core ribbon fiber held by said fiber holder;

an arrangement holder for holding said cutter and defining an arranging state of said cutter;

a shearing force applying member disposed on the base member such that the cutter and said shearing force applying member are on a plane for applying a shearing force to the multi-core ribbon fiber along the scratch after the scratch is formed on the surface of the common coating of the multi-core ribbon fiber by said cutter;

a movable member pivotally disposed in the plane; and biasing means for biasing said movable member to maintain a state in which a gap between said cutter and said movable member is substantially equal to a gap between said shearing force applying means and said movable member.

14. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a cutter for forming a scratch in said multi-core ribbon fiber on a surface of the common coating of the multi-core ribbon fiber held by said fiber holder;

first biasing means for biasing said cutter in a direction away from the containing area;

a first pushing member for causing said cutter to project into the containing area against a biasing force of said first biasing means;

an arrangement holder for holding said cutter and defining an arranging state of said cutter; and a shearing force applying member for applying a shearing force to the multi-core ribbon fiber along the scratch after the scratch is formed on the surface of the common coating of the multi-core ribbon fiber by said cutter;

second biasing means for biasing said shearing force applying member in a direction away from the containing area; and a second pushing member for causing said shearing force applying member to project into the containing area against a biasing force of said second biasing means.

15. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a rail member disposed along the multi-core ribbon fiber, said rail member having grooves in portions of an upper and lower surface of said rail member;

a cutter for forming a scratch in said multi-core ribbon fiber on a surface of the common coating of the multi-core ribbon fiber held by said fiber holder;

an arrangement holder for holding said cutter and defining an arranging state of said cutter;

a shearing force applying member for applying a shearing force to the multi-core ribbon fiber along the scratch after the scratch is formed on the surface of the common coating of the multi-core ribbon fiber by said cutter; and a shearing pushout mechanism having levers engageable with the grooves of said rail member for pushing said shearing force applying member into the containing area and interlocking said shearing force applying member with said levers when said levers engage with said grooves.

16. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a rail member disposed along the multi-core ribbon fiber, said rail member having grooves in portions of an upper and lower surface of said rail member;

a cutter for forming a scratch in said multi-core ribbon fiber on a surface of the common coating of the multi-core ribbon fiber held by said fiber holder;

an arrangement holder for holding said cutter and defining an arranging state of said cutter;

a shearing force applying member for applying a shearing force to the multi-core ribbon fiber along the scratch after the scratch is formed on the surface of the common coating of the multi-core ribbon fiber by said cutter; and a pushout mechanism having levers engageable with the grooves of said rail member for pushing said shearing force applying member into the containing area and interlocking said shearing force applying member with said levers when said levers engage with said grooves.

17. A separating tool for separating a multi-core ribbon fiber having a plurality of optical fibers arranged in a plane and integrated with a common coating, the separating tool comprising:

a fiber container for containing the multi-core ribbon fiber in an containing area;

a fiber holder for holding the multi-core ribbon fiber in the containing area;

a cutter for forming a scratch in said multi-core ribbon fiber on a surface of the common coating of the multi-core ribbon fiber held by said fiber holder;

an arrangement holder for holding said cutter and defining an arranging state of said cutter;

a shearing force applying member for applying a shearing force to the multi-core ribbon fiber along the scratch after the scratch is formed on the surface of the common coating of the multi-core ribbon fiber by said cutter; and a mechanism for pushing said shearing force applying member into the fiber containing area following a predetermined delay after said cutter forms a scratch on the multi-core ribbon fiber.

* * * * *